(12) United States Patent
Miller

(10) Patent No.: US 8,770,855 B2
(45) Date of Patent: Jul. 8, 2014

(54) OPTICAL CONNECTOR ASSEMBLY

(75) Inventor: Alistair A. Miller, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 220 days.

(21) Appl. No.: 13/328,700

(22) Filed: Dec. 16, 2011

(65) Prior Publication Data

US 2013/0156386 A1 Jun. 20, 2013

(51) Int. Cl.
*G02B 6/36* (2006.01)

(52) U.S. Cl.
USPC .......................................................... 385/53

(58) Field of Classification Search
None
See application file for complete search history.

(56) References Cited

U.S. PATENT DOCUMENTS

| | | | | |
|---|---|---|---|---|
| 4,597,631 A * | 7/1986 | Flores | | 385/53 |
| 4,808,115 A * | 2/1989 | Norton et al. | | 439/79 |
| 5,419,717 A | 5/1995 | Abendschein et al. | | |
| 6,069,992 A | 5/2000 | Hyzin | | |
| 7,490,993 B2 | 2/2009 | Pitwon | | |
| 7,625,134 B2 | 12/2009 | Pitwon et al. | | |
| 8,374,470 B2 * | 2/2013 | Ban et al. | | 385/49 |
| 2003/0053786 A1 * | 3/2003 | Kato et al. | | 385/134 |
| 2005/0074222 A1 * | 4/2005 | Hayashi et al. | | 385/147 |
| 2009/0310914 A1 * | 12/2009 | Sasaki et al. | | 385/32 |
| 2011/0222821 A1 | 9/2011 | Pitwon et al. | | |
| 2011/0222861 A1 | 9/2011 | Pitwon et al. | | |

FOREIGN PATENT DOCUMENTS

| | | |
|---|---|---|
| EP | 1 255 143 | 11/2002 |
| WO | 2006/129069 | 12/2006 |

OTHER PUBLICATIONS

Great Britain Combined Search and Examination Report dated Feb. 12, 2013 in corresponding Great Britain Patent Application No. GB1220020.0.

* cited by examiner

*Primary Examiner* — Sung Pak
(74) *Attorney, Agent, or Firm* — Pillsbury Winthrop Shaw Pittman LLP

(57) ABSTRACT

The invention provides an optical connector assembly for arrangement on a first optical printed circuit board and for connecting the first optical printed circuit board to a second optical device on a second electro optical printed circuit board, the connector assembly comprising: an electrical connector; and an optical connector; the optical connector being arranged in a housing that is fixed relative to the electrical connector, the optical connector being movably mounted in the housing so that the optical connector can move relative to the electrical connection, such that when electrical connection is made, the optical connector can still move with at least three degrees of freedom.

23 Claims, 28 Drawing Sheets

OPTICAL CONNECTOR ASSEMBLY

The present invention relates to an optical connector and method of connecting one optical component to another.

As used herein, the term "optical PCB" relates to a PCB that includes optical channels and components and also electrical channels and components.

Fibre optics technology is now used to transmit vast amounts of data around the world and in the future, the data volume is only going to increase. Typically the fibre optic cables are configured to carry modulated optical signals to convey data. Fibre optic cables can handle much higher data rates than conventional copper provided the devices generating the light signals are capable of higher switching rates. Even as this is implemented however, there tends to be a bottleneck when the light pulses are switched back to electronic pulses on printed circuit boards (PCB) or through an electrical conductor.

To alleviate some of this data choking, printed circuit boards can also be provided with optical signal carriers such as polymer waveguides, embedded fibres or the like. The optical fibres or waveguides embedded within or laminated on the surface of the PCB. Such a PCB may be referred to as an optical PCB even though it will also have on it electrical connectors and components. The use of optical pathways in this way enables much higher data rates to electronic hardware coupled to or provided on that PCB. This type of development is mentioned in various co-pending applications and granted patents of the same assignee.

Although the systems described in these patents and patent applications work well, a quick connector system for coupling light from that PCB to another device (or vice versa) in an easy, efficient and reliable manner is desired.

Attempts have been made to address this problem. Several companies are now making standardized MT type couplings to either connect fibre to fibre or fibre to transceiver devices such as optical engines. These optical connectors are known as "butt-fit" connectors since the optical fibre faces of one part overlay the fibre or optical device faces of the other part. Fit accuracies and tolerances must therefore be very high in order to minimize losses. Although connecting fibre optic cables is most often done by hand, there are now a few self-aligning MT connectors available such as those manufactured by Tyco and Molex etc. These can be placed on PCBs so that they plug in when a printed circuit board is inserted into an electronic rack for example.

There are several problems with these types of butt-fit connectors though. First of all, there is the problem of dust and dirt getting onto the connector faces before they are plugged together. Due to the small tolerances, the presence of any dirt or contaminant on an optical surface can prevent proper engagement and thereby severely degrade the optical connection. To address this, a removable cover can protect the pluggable ends of the cable until the connection is made. However, if the mating half of the connector is deep inside a storage system rack or other hardware, a cover may be difficult to remove or replace when that connection is not in use. To help minimize the dust some connectors have a folding cover that opens when the mating connector is inserted but that action can actually disturb and push dust into the opening where the optical connection takes place. Until the connection has been established, dust can frustratingly find its way onto the optical faces. Any solid contaminate on the fibre exit/entry face will have a detrimental effect of light transmission from fibre to fibre.

Cleaning before a connection is made is recommended but, again, if one half of the connector is deep within an assembly that could be difficult to manage.

Another problem arises in connecting one optical PCB to another when electrical and optical connections are needed at the same time. When a typical PCB with a connector is plugged into its mating connector on another PCB, it generally bottoms out and cannot be inserted any further. If the PCBs are optical PCBs, once bottomed out, the MT optical fibre connection must also be completely mated in order to have maximum coupling. Currently the mating part of the butt coupled connector system is latch and spring loaded to allow for some fit tolerance or errors in the parts but there is no guarantee that the springs will push the mating pins entirely into the other part if the PCB electrical connector bottoms out early. Aligning accuracies are critical as well due to the small size of the MT pins and mating holes.

In commonly-owned U.S. Pat. No. 7,625,134 (the entire contents of which are hereby incorporated by reference), corresponding to WO-A-2006/129069, there is disclosed an optical connector for connecting a user circuit to an optical backplane.

In commonly-owned U.S. Pat. No. 7,490,993, the entire contents of which are hereby incorporated by reference, there is disclosed an adapter for an optical printed circuit board.

In commonly-owned US-A-2011/222861, the entire contents of which are hereby incorporated by reference, there is disclosed an optical interconnect for a data storage device, the interconnect comprising a directly pluggable optical connector to enable optical communication between a data storage device and a backplane to which the data storage device is in use to be connected. The optical interconnect includes an optical engine for generating and receiving optical signals for transmission between the user circuit and the backplane.

In commonly-owned US-A-2011/0222821, there is provided an optical printed circuit board connector arranged to be connected in use to a first optical printed circuit board, the connector comprising: a housing; an optical interface for connection in use to another optical interface on a second optical printed circuit board to which in use the optical printed circuit board connector is arranged to be connected, in which the optical interface on the connector is mounted such that it is movable about an axis orthogonal to the plane of the first optical printed circuit board to which, in use it is connected, to vary the launch angle of light from the interface with respect to the housing and/or the first optical printed circuit board.

According to a first aspect of the present invention, there is provided an optical connector assembly for connecting an optical device to another optical device on an optical printed circuit board, the connector assembly comprising: an electrical connector; and an optical connector; the optical connector being arranged in a housing that is fixed relative to the electrical connector, the optical connector being movably mounted in the housing so that the optical connector can move relative to the electrical connection, such that when electrical connection is made, the optical connector can still move with at least three degrees of freedom.

An optical connector assembly is provided that provides a simple and reliable means by two optical PCBs can be connected together. In particular by providing a floating optical connection having at least three degrees of freedom it is possible to ensure that when an electrical connection between two optical PCBs is correctly made an optical connection can also be made with the optical components being correctly aligned. The floating nature of the optical connector enables it to move relative to the electrical connector such that it can move to be in a position that is required for good optical communication. This means that the precise relative position of the optical and electrical connector during manufacture is not as critical as it was previously since the movable nature of the optical connector means it can move to be in the right position for a good connection if it is not in the first place.

In an embodiment, the optical connector assembly comprises a movable compliant part mounted within the fixed housing and arranged to move relative to the housing upon engagement with a corresponding connector on a second optical printed circuit board. The use of a compliant part within a fixed housing provides a reliable and straightforward means of ensuring that the optical interface can move relative to the electrical parts of the connector assembly.

In an embodiment, the compliant part has guidance grooves to engage in use with corresponding projections on a second optical PCB. The use of guidance grooves ensures a reliable and repeatable engagement between different parts of the connector assembly.

In an embodiment, the optical connector assembly comprises a spring member to bias the compliant part away from the housing.

In an embodiment, the spring member is a unitary component arranged to bias the compliant part in two orthogonal directions. The use of a unitary spring member reduces part count and simplifies manufacture and assembly of the connector assembly.

In an embodiment, the spring member is a stamped and formed from metal sheet.

In an embodiment, the spring member has plural spring elements configured to provide a balanced supporting force to the compliant member. The use of plural spring elements enables a distributed biasing force to be applied to the compliant part, which means the actual distribution of force can be controlled as desired to ensure the orientation of the compliant part relative to the fixed housing is as wanted.

In an embodiment, the compliant part comprises a shaped surface to engage with spring member.

In an embodiment, the shaped surface comprises one or more sloped cam surfaces to enable a variable biasing force to be provided in dependence on the connector assembly position.

In an embodiment, the compliant part has a recess for receiving an optical component for receiving and transmitting optical signals, the optical component being aligned with the compliant part using one or more guide pins.

In an embodiment, the compliant member has a slidable shield to cover an optical component when provided in the complaint member and automatically clean the optical component when the connector assembly is engaged. The use of a slidable shield provides a simple and reliable means for keeping the optical components such as lenses and the like clean and free of dust and contaminants. Within a computer environment this can be very important and so the present embodiment provides a simple and robust solution to this possible problem.

In an embodiment, the compliant part has one or more slots and/or grooves for supporting the shield and to provide controlled movement of the shield as it moves between open and closed positions. The grooves provide a reliable means by which the movement of the shield can be controlled.

In an embodiment, comprising an optical component arranged within the recess, the optical component having one or more transmitting or receiving lenses to enable good optical connection with low tolerances.

In an embodiment, the optical component is an MT ferrule.

In an embodiment, the optical connector assembly comprises one or more retaining members to fixedly retain the optical component to the compliant member. The use of retaining members ensures the connection between the complaint part and the optical component is reliably maintained.

According to a second aspect of the present invention, there is provided an optical connector assembly for connecting an optical device to another optical device on an electro optical printed circuit board, the connector assembly comprising: an electrical connector; and an optical engine; an optical engine cover fixed relative to the optical engine, the optical engine cover having an opening through which light can be received by or transmitted from the optical engine, guidance components to engage with an optical connector assembly according to the first aspect of the present invention, the electrical connector and the optical engine being fixed relative to each other.

In an embodiment, the guidance components comprise alignment stubs.

In an embodiment, the optical connector assembly comprises three or more alignment stubs arranged in a two dimensional configuration so as to enable the alignment stubs to be used in controlling the orientation of the optical engine.

According to a third aspect of the present invention, there is provided an optical connector assembly for connecting a first optical printed circuit board to a second electro optical printed circuit board, the connector assembly comprising a first part for arrangement on the first optical printed circuit board and a second part for arrangement on the second optical printed circuit board, the first part comprising: a first electrical connector; and an optical connector; the optical connector being arranged in a housing that is fixed relative to the first electrical connector, the optical connector being movably mounted in the housing so that the optical connector can move relative to the electrical connection, such that when electrical connection is made, the optical connector can still move with at least three degrees of freedom; and, the second part comprising: a second electrical connector; and an optical engine; an optical engine cover fixed relative to the optical engine, the optical engine cover having an opening through which light can be received by or transmitted from the optical engine, guidance components to engage with the first optical connector of the first part, the second electrical connector and the optical engine being fixed relative to each other.

Embodiments of the present invention will now be described in detail with reference to the accompanying drawings, in which.

Figure 1:
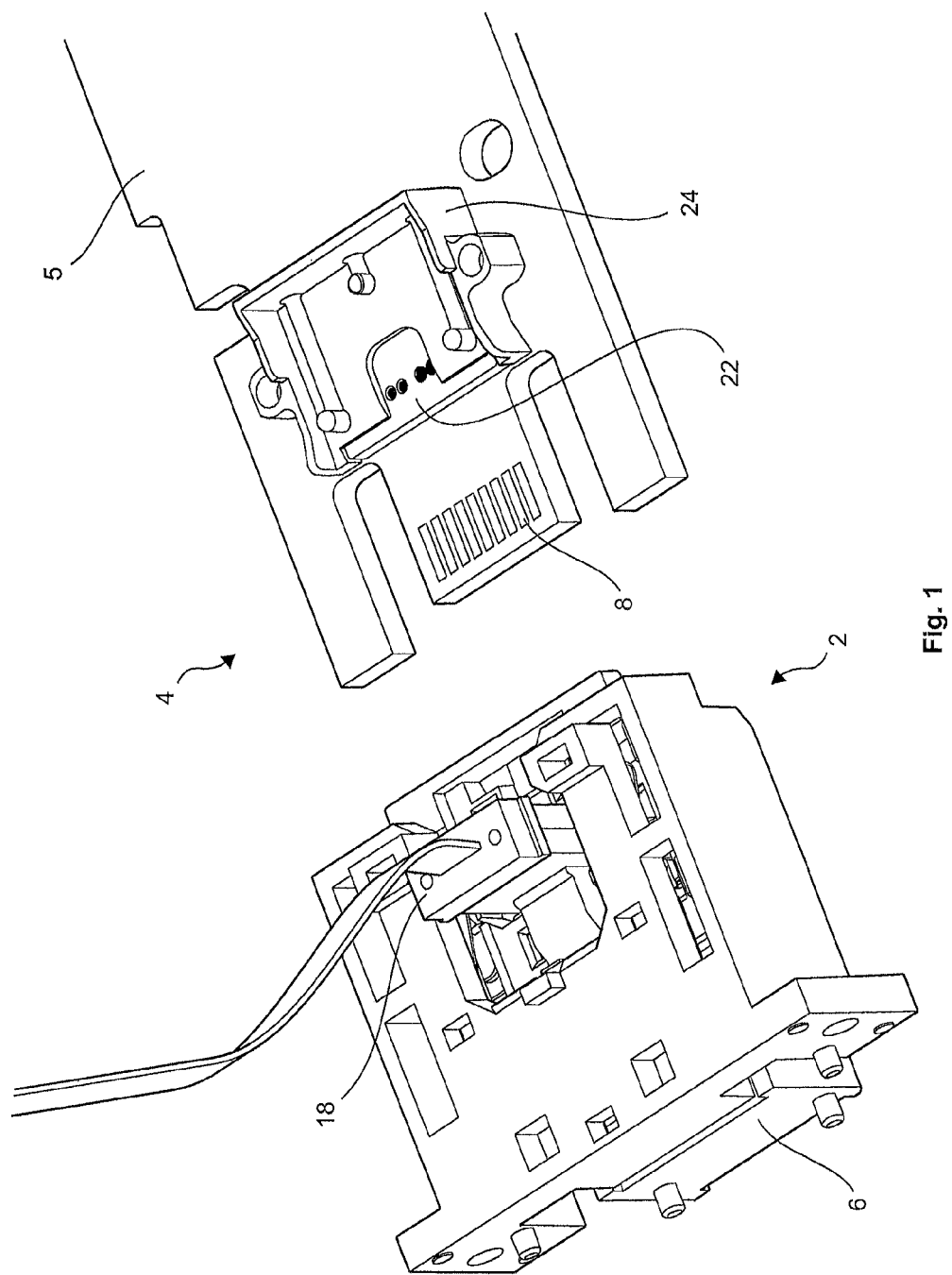
FIG. 1 is a schematic representation of a view from above of an optical PCB connector assembly.

FIG. 1 is a schematic representation of a view from above of an optical PCB connector assembly. The assembly comprises a first part 2 which would typically be permanently mounted to a first PCB (not shown). A second part 4 is provided on, or as an integrated part of, a second PCB 5 which, in use, is plugged into and connected to the first part 2. Individually, each of the first 2 and second 4 parts is an optical PCB connector assembly. In combination they also form an optical PCB connector assembly.

The connector assembly first part 2 comprises an electrical socket 6 for receiving an electrical connector 8 on the second part of the connector assembly. The electrical connections 8 on the second part 4 may be provided as integrated with the optical PCB 5.

The optical PCB connector assembly is a low-cost optical connection product that mechanically aligns a single or plural optical fibres to the input(s)/output(s) of an optical transceiver such as an optical engine. Most of the parts for the optical connector assembly are injection moulded in mass production and therefore attain a high degree of repeatable accuracy. The first part 2 is typically for fixing on a first optical PCB such as an optical backplane.

Figure 2:
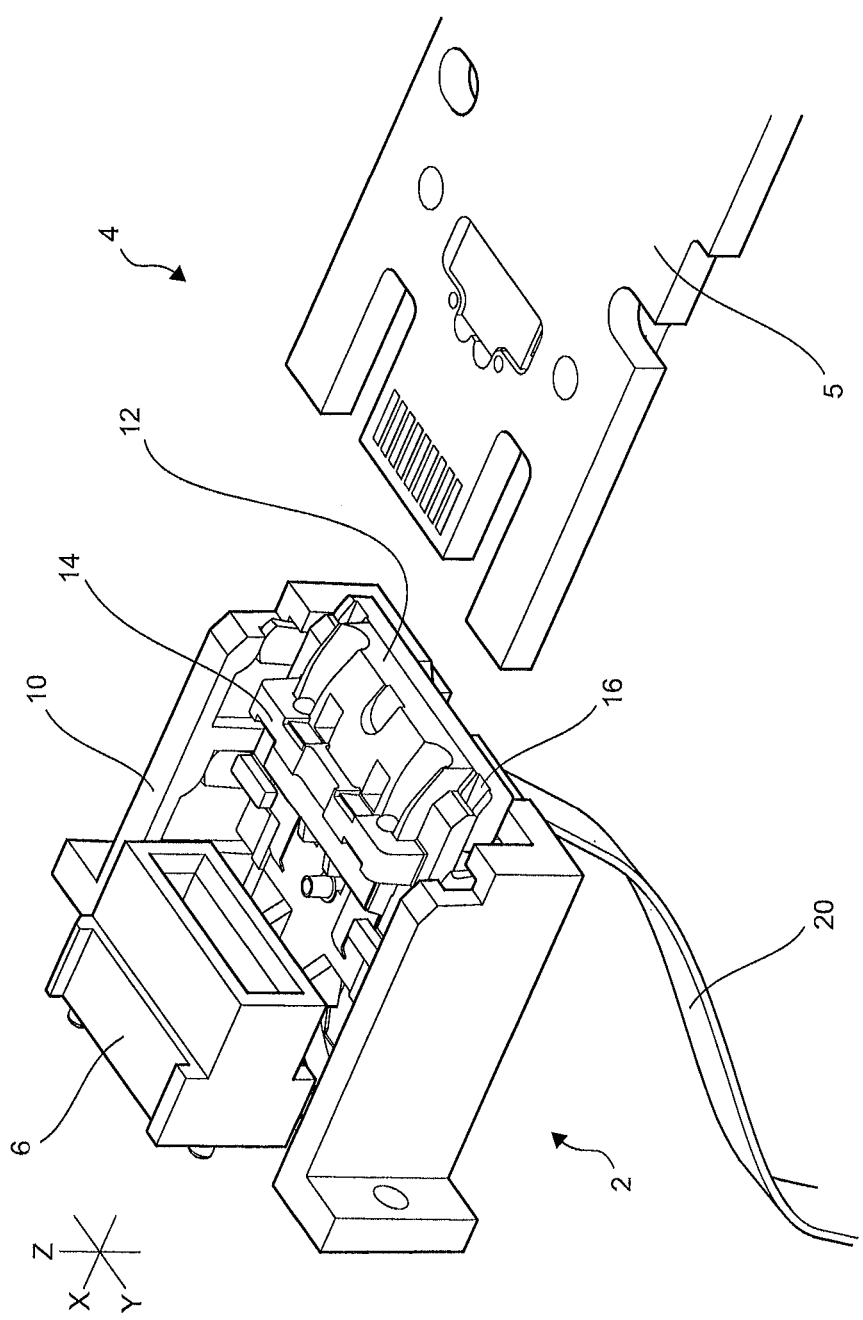
FIG. 2 is a schematic representation of a view from below of the optical PCB connector assembly of FIG. 1.

Referring to FIG. 2, the first part 2 comprises a housing 10 which is shown physically connected to the first optical PCB. This may be achieved with the use of bolts, screws or otherwise. A compliant part 12 is provided, movably mounted within the housing 10, as will be described in detail below. The compliant part 12 has coupled to it an optical connector or plug 18. In this example the optical plug 18 has a 1×12 fibre optic ribbon coupled to it, to carry optical signals both to and from the plug 18 itself. The optical plug 18 is typically a standard MT ferrule. An electrical socket 6 is provided for receiving an electrical plug 8 forming part of the second part 4.

The compliant part 12 has a slidable cover 86 which is arranged in use to slide in grooves 16 so as to expose optical components beneath.

The second part 4 is for provision on a second optical PCB assembly and comprises an optical engine 22 is together with a cover 24. When the second part 4 is brought into coupled engagement with the first part 2 an electrical connection is made by the electrical socket 6 on the first part 2 and the electrical connector or plug 8 on the second part 4. This can be a conventional fixed electrical connection such that electrical contacts within the socket 6 are arranged to engage electrical contacts forming the connector or plug 8. It will of course be appreciated that the plugs and sockets could be swapped around such that the electrical socket 6 would be provided on the second part 4, and the electrical connector 8 on the first part 2. Preferably the socket 6 includes electrical contacts (not shown) to engage with electrical contacts on the connector 8 when the socket and connector 8 are brought into engagement.

As explained above, when electrical and optical connections are needed at the same time, a problem can arise since when a typical PCB with a connector is plugged into its mating connector, it bottoms out and cannot be inserted any further. Once bottomed out, there is no available movement between the first and second parts of the connector assembly. In the present case, the use of a compliant part 12 for housing or providing the optical connectivity within the first part 2, enables some movement between the first part 2 and the second part 4 even when the electrical connection is made and bottomed out. The compliant part 12 can move within the housing 10 with six degrees of freedom, i.e. translationally with three degrees of freedom in an x, y and z direction as shown in FIG. 2. In some examples the three degrees of freedom may not all be translational.

In the present embodiment, the final X, Y, Z position of the compliant part 12 will be determined by the final mated position of the printed circuit board 5 in the electrical socket 6 (given that the optical engine is rigidly mounted to the PCB 5). The electrical socket 6 should therefore preferably be mounted in such a way that the entry slot geometry e.g. mid-planes, overlap or are configured in a defined manner with the mid-planes of the tolerance specifications of the compliant part 12. If the electrical socket 6 is positioned accordingly, the compliant part will allow for entry stage misalignments tolerances as follows;

X axis—(in and out of connector): 0 (bottomed out) to +1 mm

Y axis—(side to side): +/−1 mm

Z axis—(up and down on the spring members): +/−1 mm

In this particular non-limiting embodiment, the X axis tolerance is restricted as the connector 2 needs to fit into existing architecture. It can be understood for other applications that by simply stretching the dimensions of design in the X axis, the spring members 68-1, 68-2 and 68-3 could rest on longer flat surfaces after riding up the cammed surfaces 76 and 78. This would allow for increased X axis tolerance. Typically, the X axis tolerance is driven by the actual connector used.

As the compliant part 12 is resting inside housing part 10 and also engaged with spring members 68-1, 68-2 and 68-3, it is able to shift its position in rotational axes and well as translational axes. Should the part 4 enter at a slight tilt relative to the compliant part 12 it means the compliant part will still be able to engage fully with the optical engine cover 24. Ultimately however, part 4 and its printed circuit board 5 will have to be able to untilt as it enters the electrical socket 6.

The degree of angular movement, i.e. rotation about the axes X, Y and Z is typically as follows:

Pitch—+/−3 degrees

Yaw—+/−3 degrees

Roll—+/−2 degrees

In another embodiment larger tolerances or degrees of movements could be provided for. For example movement of +/−2 mm or +/−3 mm in any of the X, Y and Z directions could be provided for.

Figure 3:
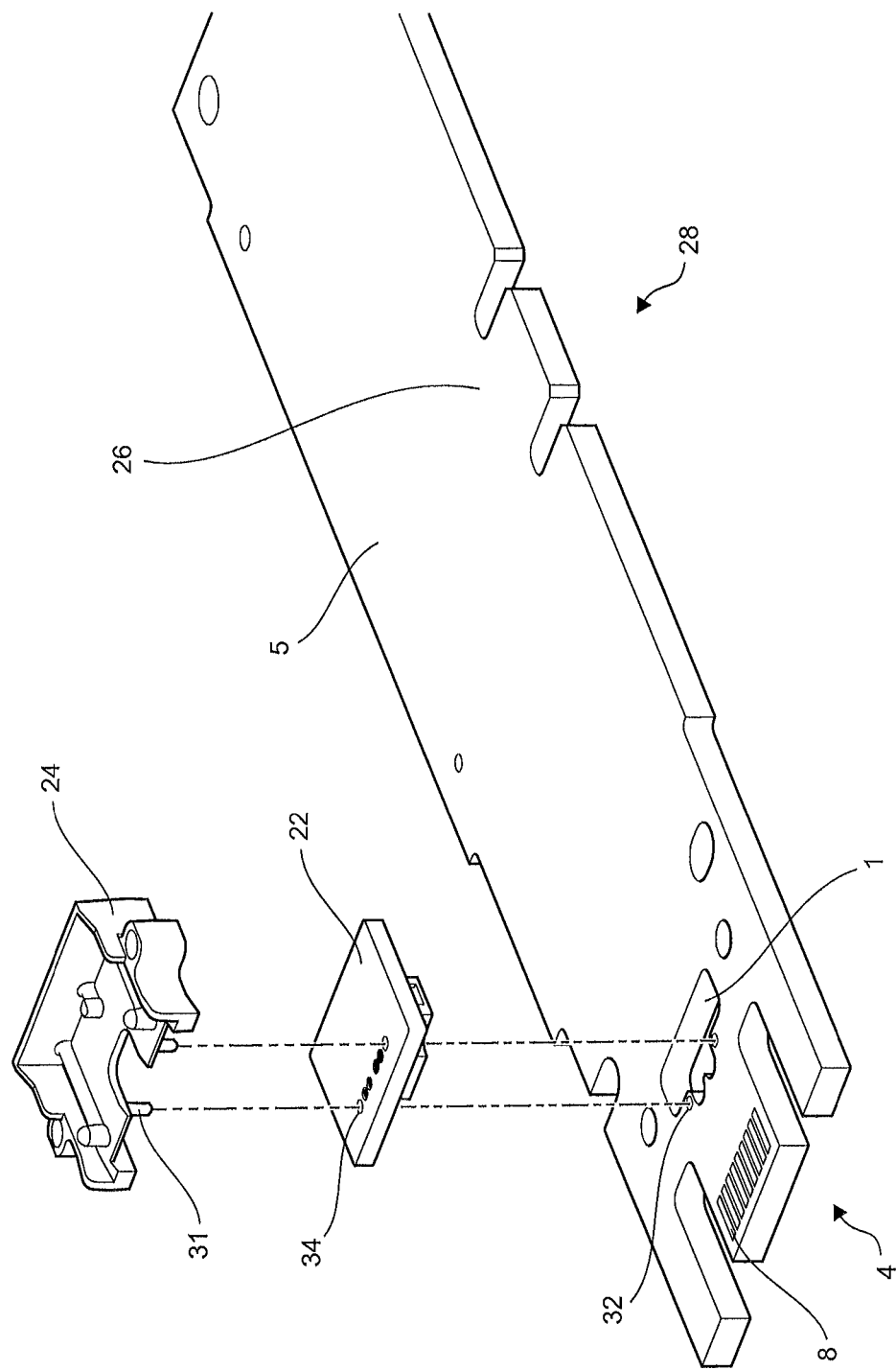
FIG. 3 is an exploded view of part of the optical PCB connector assembly of FIG. 1.

FIG. 3 shows a schematic arrangement of the second part 4 in exploded view. An optical engine 22, (FibreLyte), is provided which, in the example shown, is manufactured by Conjunct Ltd. It will be appreciated that any optical engine that includes collimating lenses on the light exit/entrance faces could be used. The optical engine is a surface mounted component and is typically located near the connection end of the PCB 5 on which it is mounted. Referring to FIG. 3, the PCB 5 has at a first end 28 an electrical connector 8, as described above with respect to FIGS. 1 and 2. An optical engine 22 is surface mounted on the PCB 5. In this example, a suitably sized opening 30 is formed in the PCB to receive the optical engine 22. The optical engine is thus mounted near the first end 28 of the PCB, which is close to the electrical connector 8.

The optical engine is shrouded by an optical engine cover 24. The cover 24 comprises pins 31 that are shaped and sized to correspond to holes 32 provided on the PCB 5. The pins 31 are preferably sized and spaced for engagement with standard MT mounting holes 34 in the optical engine. The cover 24 provides protection to the optical engine and assists in the optical alignment of the connector.

It will be appreciated that in its simplest form, an optical engine is simply a glass-covered optical device that is arranged to emit and gather light from its top surface, i.e. perpendicular to the major plane of a printed circuit board on which it is arranged.

Figure 4:
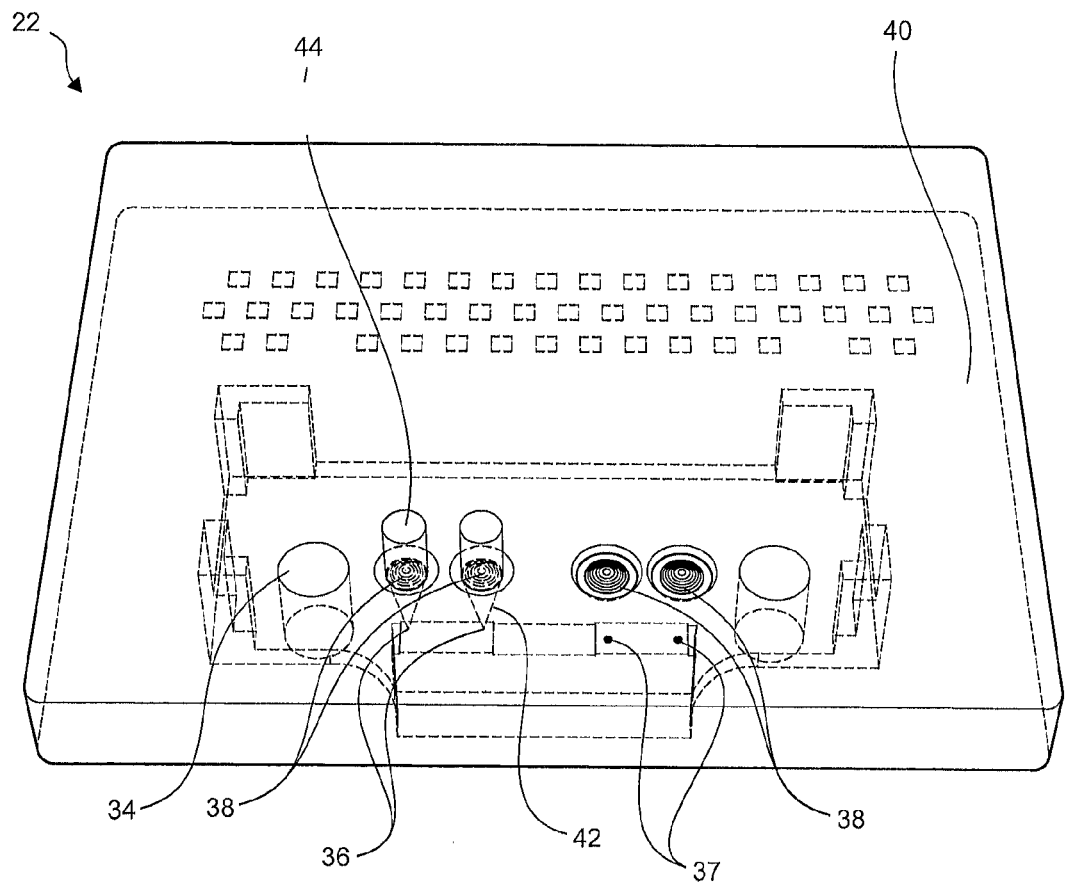
FIG. 4 is a schematic representation of an optical engine as might be used in an optical PCB connector assembly.

FIG. 4 shows a perspective view from above of an example of an optical engine 22. The optical engine comprises four vertical cavity surface emitting lasers (VCSELs) and four pin diodes, but in the example shown, only two of each are used. This allows larger diameter collimating lenses to be used in the optical system. The lens profiles are fabricated in the surface of the part of the optical engine above the VCSELs 36 and pin diodes 37.

In the example shown, two VCSELs 36 are provided for generating pulsed laser signals and two pin diodes are provided for receiving optical signals. Lenses 38 are shaped into the glass body 40 of the optical engine so as to collimate light emanating from the VCSELs or focus light onto the Pin diodes 37 from the optical connector 2 as will be described below. As can be seen, referring to the VCSELs 36 the light 42 transmitted by the VCSEL emanates in a cone but is then collimated by the lenses 38 so as to generate a parallel or substantially parallel beam 44 of signal light for onward propagation.

Since the optical engine transmits and receives light perpendicular to its top surface, this means that to couple a waveguide or optical fibre to the device, a standard MT type fitting would normally need to be plugged directly into the device using the standard MT positioning holes to achieve accurate alignment. It is possible to do this by hand where connections are accessible but this can become a problem when the connection to another printed circuit board, such as a motherboard, is beyond the reach of the average user's hand. Furthermore, the glass surface of the optical engine is fragile so great care must be taken when connecting directly to it.

In the present connector assembly, the coupling is achieved by simply sliding the optical engine PCB into its fixed mating section on another PCB such as a back plane. The electrical connection is made as described above with reference to FIGS. 1 and 2 and due to the compliant nature of the floating or compliant part 12, to be described below, accurate alignment between the optical plug 18 and the optical engine 22 is achieved. Furthermore, the use of collimating lenses means that the tolerances can be higher since the cross section of the beams being transmitted or received is correspondingly increased.

Indeed, the corresponding optical fibres in the MT ferrule will then be aligned directly underneath the optical engine VCSELs and detecting receivers (pin photo diodes). Two sets of lens arrays, one set on the optical engine and another set above the exit surface of the MT ferrule, are used to efficiently couple the light between the optical engine and the MT ferrule 18.

In the example of FIG. 4, where there is a 2×2 configuration, i.e. two VCSELs and two pin diodes, the collimated beam diameters from the VCSELs will typically be in the order of 600 microns at the exit surface of the lens arrays, compared to a typical MT butt coupled connected fibre which has a 50 micron diameter. The larger diameter provides a significant advantage when it comes to the effect of dust particles and other such contaminants which may become positioned on the exit surface. A beam diameter in the order of 600 microns will have an area at least 144 times that of a 50 micron diameter fibre. This means that even larger dust particles will have proportionally less effect on the light and cause proportionally significantly less obstruction. For example, a 60 micron dust particle sitting on a 50 micron diameter fibre face could potentially block all the light exiting. However, this same particle would only block approximately 1% of the light if it were positioned on the lens surface of a 600 micron diameter beam.

In addition, the use of larger diameter lenses also provides a further benefit. If the receiving lens of a collimated beam is slightly larger in diameter, this means the alignment tolerances are less critical. Misalignment of optical axes could be in the tens of microns, with no noticeable effect on efficiency. In contrast, were the conventional 50 micron diameter fibre to be used, any misalignment of the order of merely single microns could have a deleterious effect.

In the present example, the lenses serve to collimate light emitted from a small diameter source, which is typically a seven micron VCSEL. The lenses above each VCSEL are provided so as to create a substantially parallel beam of light that can propagate a substantial distance before diverging. The light leaving the optical engine is collimated such that it propagates in a parallel or substantially parallel beam. If another similar lens is placed into the collimated beam, the other similar lens will serve to focus the light into a small diameter, similar to that of the VCSEL source. If an input end of an optical fibre or waveguide is located at that focus, the light will enter it and begin its journey along the optical fibre or waveguide. Because this type of coupling uses collimated light which is parallel or substantially parallel, it means it is largely insensitive to lens separation distance. Indeed, the distance before significant divergence occurs will typically be significantly more than that required, i.e. the spacing between the two sets of lenses.

The converse is true for light exiting the fibre optic except, it is going in the reverse direction compared to light from the VCSEL. In this case, light from the fibre will end up being collimated and then focused by two lenses onto the active receiving areas of the pin diodes within the optical engine before being converted back into an electrical signal.

Figure 5:
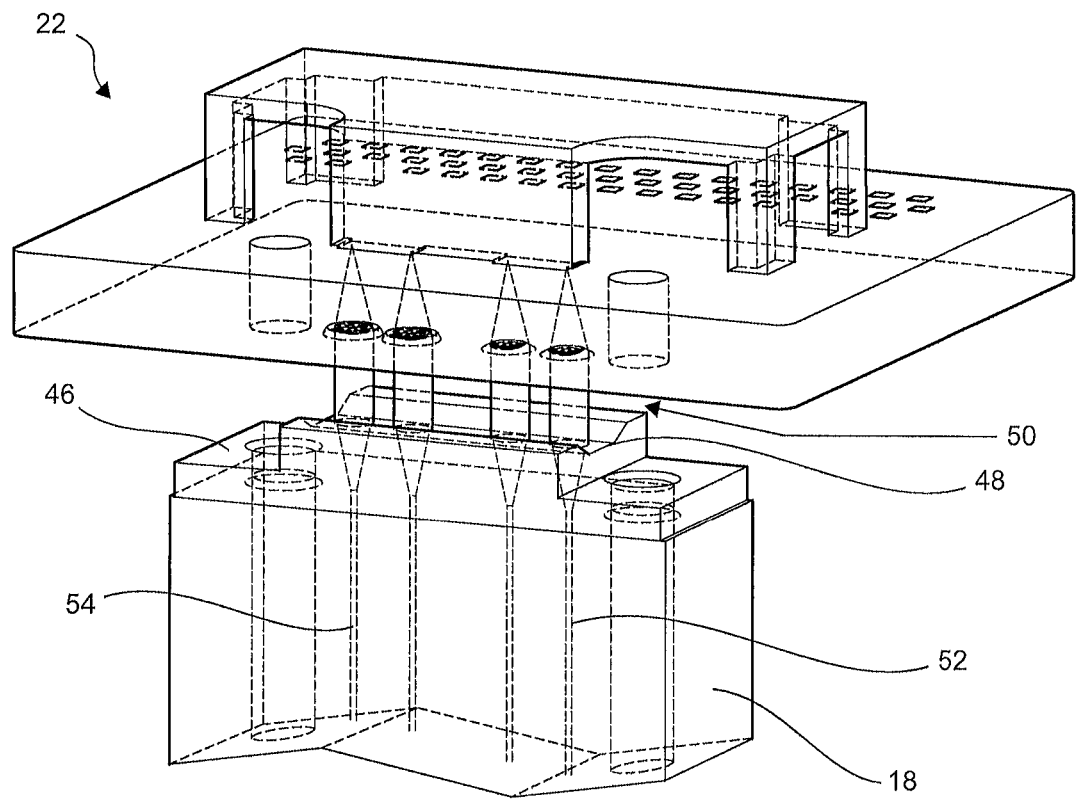
FIG. 5 is a schematic representation of a view of the optical components only of an optical PCB connector assembly.

FIG. 5 shows a schematic representation of the optical parts only of the optical PCB connector assembly, including the MT ferrule or plug 18 and the optical engine 22. The optical engine is of the type shown in FIG. 4. The optical parts are shown connected such that optical signal propagation between the plug 18 and the optical engine 22 is possible. Once the PCB 5 with the optical engine 22 is inserted into the first part 2 of the optical PCB connector assembly, due to the interaction between the compliant part 12 and the optical engine and its cover, an optical connection is made.

The MT ferrule or plug 18 is provided with a lens array insert 46 comprising lenses 48. The lens array 46 is aligned with the lenses in the optical engine 22 such that the individual lenses of the lens array insert 46 share the same optical axes as the corresponding lenses of the optical engine. Typically the lens array insert 46 is formed of glass or polymer. The lenses 48 may be graded index (GRIN) lenses or any other suitable type of collimating lens. This means that light leaving the optical engine 50 is focused by the opposing lens in the lens array insert 46 into the fibre optic 52 below. The same is true for the light leaving the fibre optics 54 in that it is collimated by the lens above it in the lens array insert 46 and is then focused by the corresponding lens in the optical engine into a pin diode in the optical engine.

It will be understood that the MT ferrule is a standard in the optical components industry and includes clips and dowel structures (not shown in FIG. 5) to ensure that it is aligned accurately to the lens array insert 46. The means by which the. MT ferrule or plug 18 may be coupled to the compliant part 12 of the optical PCB connector assembly will be described below.

The optical engine cover, the compliant part and the lens array insert preferably have manufactured tolerances in the 0.005 mm range so as to ensure alignment of the optical axes as described above. Precision moulding techniques are well capable of providing this level of manufacturing tolerance. In use, as shown in FIG. 5 there is spacing between the lenses of the optical engine and those of the lens array coupled to the ferrule 18. The spacing means that instead of being a butt coupled connector of the type described in the prior art referred to above, an air gap is maintained between the sets of lenses on either side of the optical connection. Typically this spacing will be between about 0.5-3 mm. In the example shown and described this spacing is typically 0.9 mm.

The means by which optical signals may be coupled between the optical engine 22 and the MT ferrule or plug 18 have been described above. The means by which the optical components are physically brought into contact with each other and configured and arranged so as to ensure that the optical communication is at a sufficiently high level, are important. Indeed, when the first 2 and second 4 parts of the optical PCB connector assembly are engaged, an accurate and stable optical connection is required between the two parts. As explained above, in known systems, this was physically achieved with the use of MT connectors including dowels fitting into holes, coupled with face-to-face contact of fibre end faces.

In contrast, the present system utilises the alignment of opposing collimating lenses (preferably spaced apart) together with a compliant or movable part with in the optical PCB connector assembly. As will be described below, in the present system, high precision injection moulds can be used to make a number of parts which enable high tolerance parts to mate mechanically together. In addition, a spring array is used to provide a number of degrees of freedom for the compliant part so as to enable accurate and flexible alignment between the optical components. Preferably, the spring array is stamped and formed, which provides for simple and low-cost manufacturing. Typically the spring array is arranged to provide at least two translational degrees of freedom (in the y and z directions as shown in FIG. 2) to the compliant part. Since individual ones of the spring elements can be depressed by different amounts, the spring array also provides rotational degrees of freedom.

As explained above, the optical alignment is achieved with the use of engagement between an optical engine and its cover provided in the second part 4 of the optical PCB connector assembly and the compliant part 12 provided in the first part 2 of the optical PCB connector assembly. Due to its mounting within the housing 10 of first part 2, the compliant part 12 is able to shift from side to side, up and down and backwards and forwards so as to ensure accurate alignment between the optical interface within the optical engine 22 and the optical interface within the MT ferrule or plug 18 which will be fixedly and unmovably connected, in use, to the compliant part 12. In addition due to the mounting, in embodiments, the compliant part 12 is able to tilt, roll and yaw so that the compliant part can move both translationally and rotationally.

Figure 6:
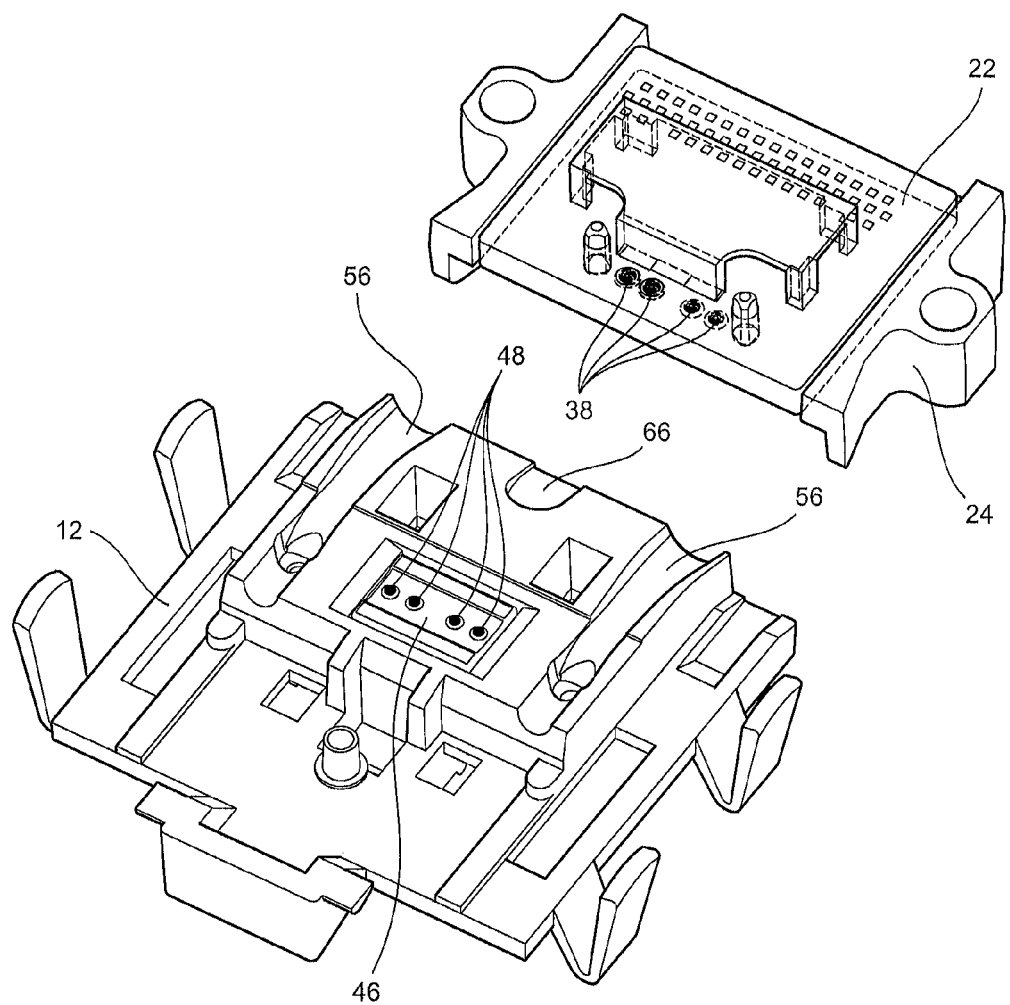
FIG. 6 is a schematic representation of a compliant part and an optical engine for use in optical PCB connector assembly.
Figure 7:
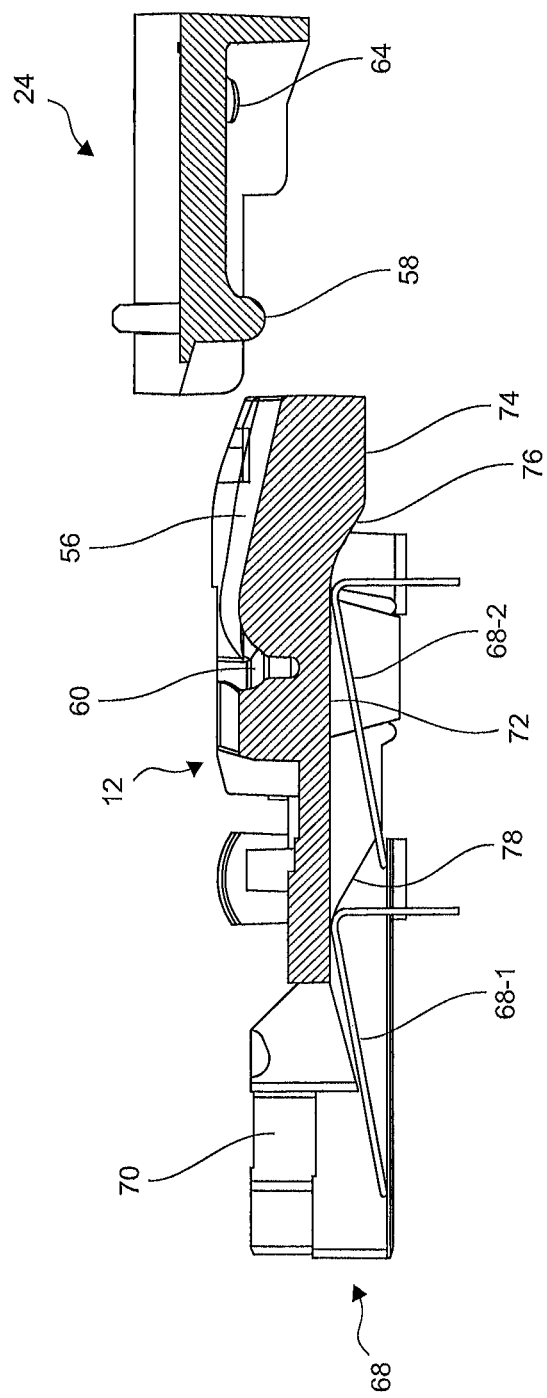
FIGS. 7 to 11 show a schematic representation of the stages in engagement between an optical engine cover and a compliant part within an optical PCB connector assembly.

FIG. 6 shows a schematic representation of the compliant part together with the optical engine cover. The compliant part 12 includes two alignment channels 56 which serve to receive alignment stubs 58 provided on the optical engine cover 24. As the optical engine cover (housing the optical engine) is brought into engagement with the first part 2 of the optical PCB connector assembly, the stubs 58 are received in and guided by the channels 56 so as to ensure alignment between the exposed lenses 48 from the lens array insert 46 coupled to the MT ferrule (not shown in FIG. 6). Due to the engagement between the channels 56 and the stubs 58, the lenses 38 on the optical engine 22 are automatically aligned with the lenses 48 on the MT ferrule 18 in such a way that optical signals can propagate between the optical engine and the MT ferrule 18 as shown in FIG. 5.

It will be appreciated that the optical engine cover 24 is fixedly mounted to the PCB 5 on which the second part 4 of the optical PCB connector assembly is formed. Thus, the compliant part 12 of the first part of the optical PCB connector assembly is able to move relative to its housing 10 and the fixed electrical socket 6. This means that even once the electrical connection is made between the two optical PCBs, there can be relative movement between the optical components on each side of the connector assembly so as to ensure accurate alignment.

Referring now in greater detail to the optical engine cover and the compliant part, it can be seen that the rounded stubs 58 on the optical engine cover 24 are arranged to fit into mating engagement with depressions 60 on the compliant part 12. As can be seen from FIGS. 6 to 11, the channels 56 terminate in depressions 60 that preferably have rounded or three sided pyramidal bottom shapes. The depressions are located past the maximum height of a gradually narrowing and inclining guiding channel. The channels make a quick declining transition into the mating depressions. They therefore serve as an inverse detent to the optical engine cover rounded stubs.

In use, when the optical engine printed circuit board with the optical engine and optical engine cover has begun its mating process, the optical engine cover encounters the compliant part that is loosely held in the fixed section of the connector. The compliant part 12 shifts its side to side position allowing the two rounded stubs 58 on the optical engine cover to slide inside and on the surface of its two guide channels 56. As the optical engine cover is pushed further, the compliant part 12 begins to be pushed downwards against supporting biasing springs, to be described below, due to the inclined profile of the channels. When the insertion process reaches a stage at which the rounded stubs of the optical engine cover go past the maximum height of the channel profile, the supporting biasing springs pushing up on the compliant part 12, force it to make a final mating position with the rounded stubs on the optical engine cover 12 as it enters far enough to allow that action. Due to the steeper angle into the depressions 62, preferably the mating occurs with a quick snap which will confirm to a user that mating has occurred.

As explained above, the compliant part 12 achieves its compliant nature by virtue of it being supported by one or more biasing springs which, enable it to give somewhat given when in engagement with the optical engine and its cover.

Figure 8:
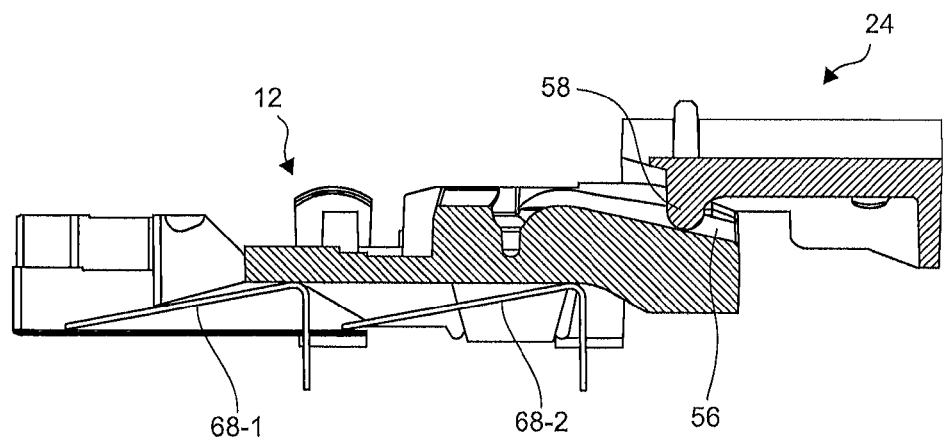
Figure 9:
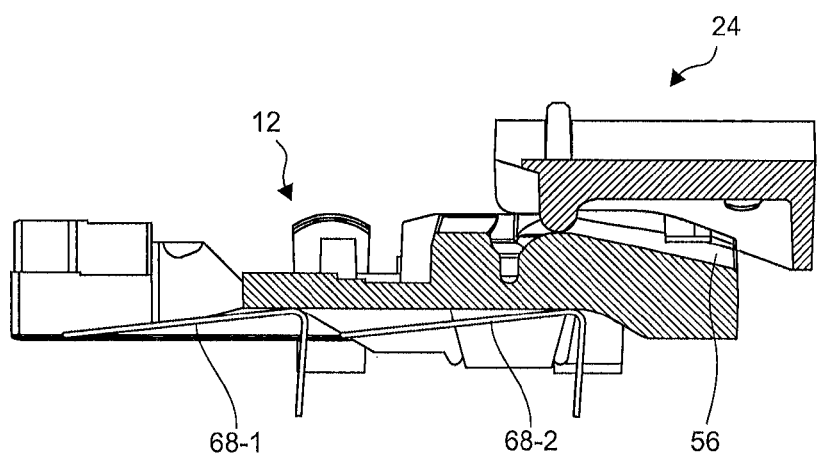
Figure 10:
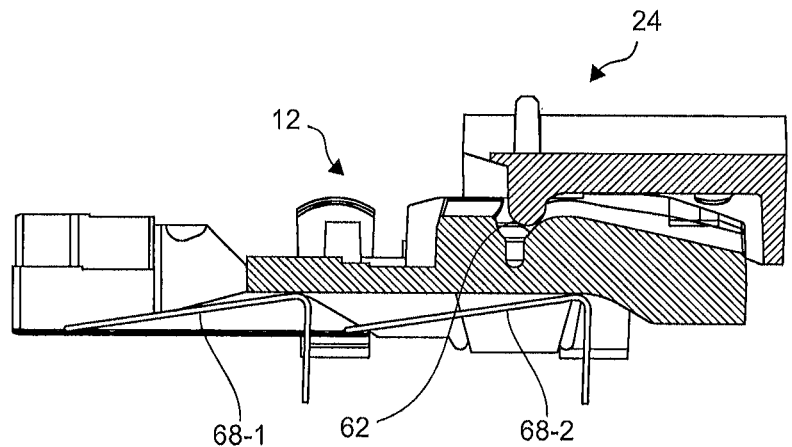

Referring to FIGS. 7 to 11, it can be seen that the compliant part is biased upwards by the effect of spring elements 68-1 to 68-3 (only 68-1 and 68-2 seen in FIGS. 7 to 11). The engagement of the compliant part 12 with the optical engine cover 24 will be described. FIGS. 7 to 11 show the various stages as the optical engine cover 24 enters the guiding channels 56 of the compliant part 12, until the rounded stubs 58 are fully seated into the final mating position. In FIG. 8, the rounded stub 58 first comes into contact with the surface of the guiding channel 56. In FIG. 9, the highest point of the guiding channel 56 is in engagement with the rounded stub 58. In FIG. 10, the rounded stub 58 has passed the highest point and therefore is on the downward slope section 62 of the guiding channel 56 profile. Due to the effect of the biasing spring elements the compliant part 12 is forced upwardly with respect to the optical engine cover 24 so as to provide a snap fit engagement between the compliant part 12 and the cover 24.

Figure 11:
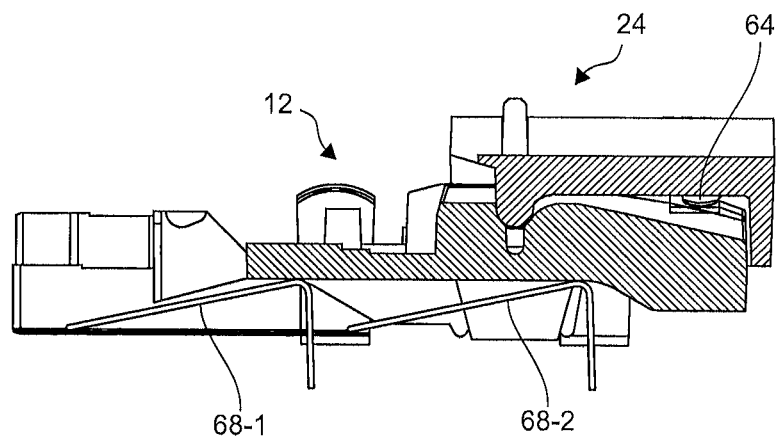

The rounded stubs (or nubs) 58 seated in the mating depressions 60 of the guide channels 56, only count for two locations on a mating plane. A third position is provided so as to maintain the substantially parallel relationship between the optical engine and the optical engine cover with respect to the compliant part 12. This is achieved with a third middle landing stub (or nub) 64 which is arranged to engage a suitable depression or cut-out 66 (shown in FIG. 6) provided in the compliant part 12. Thus, as can be seen in FIG. 11 when the optical engine cover 24 and the compliant part 12 are fully engaged, the stubs 58 and the landing nub 64 are all in engagement with the corresponding detents or recesses on the compliant part. Preferably, the third or middle landing nub 64 is provided between the guide channels and towards the rear of the optical engine cover so as to space the contact points in a way as to provide a stable engagement between the optical engine cover 24 and the compliant part 12. By appropriate positioning of the stubs 58 and landing nub 64, a stable and reliable interaction between the compliant part and the optical engine cover is achieved.

Referring again to FIGS. 7 to 11, the operation of spring member 68 will be described. The spring member (shown most clearly in FIGS. 24 and 25) is preferably formed of a unitary stamped metal sheet. The spring member comprises three vertical spring elements 68-1 to 68-3 and a horizontal spring element 70. The vertical spring elements 68-1 to 68-3 serve to provide an upward biasing force to the compliant part 12 whereas the spring element 70 provides a horizontal biasing force.

Figure 24:
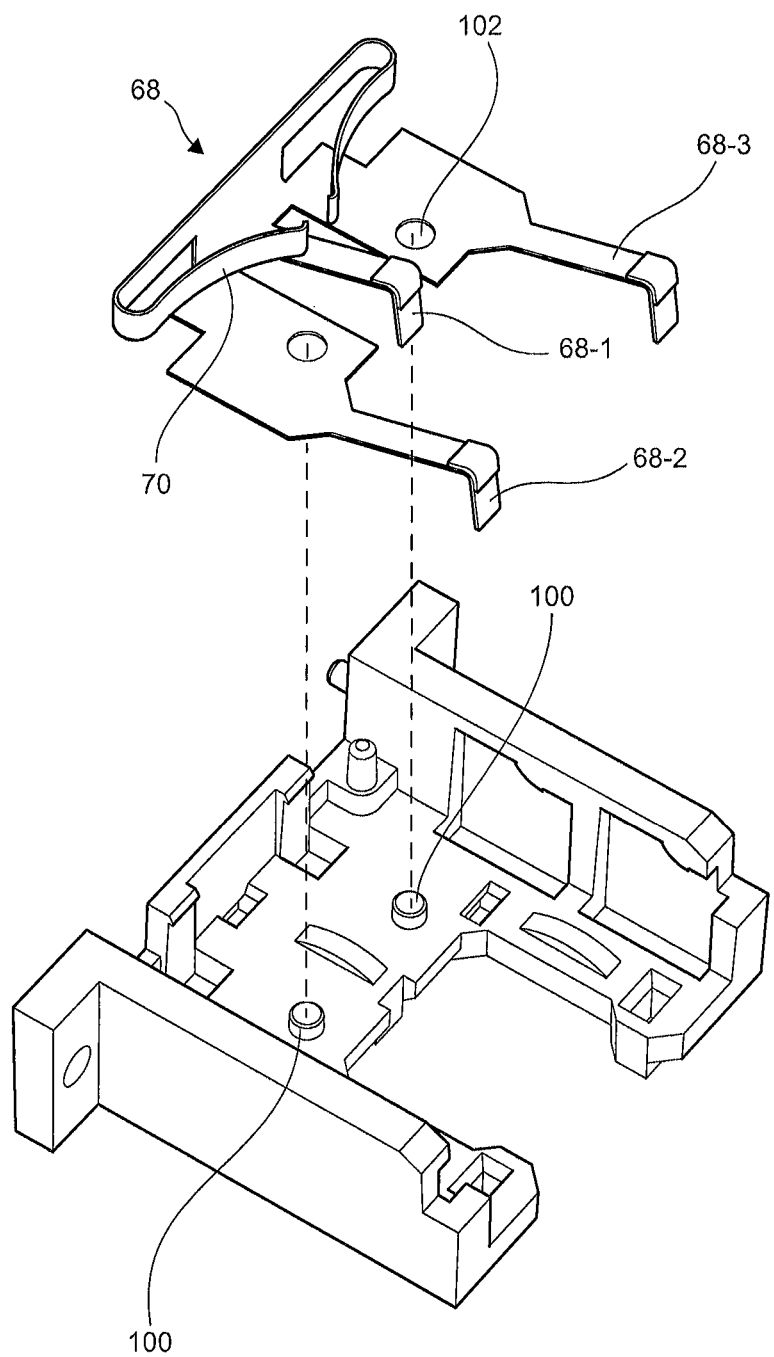
FIG. 24 shows the static part of the housing of FIG. 23 together with a spring element for providing biasing forces to the compliant part of any of FIGS. 16 to 22.

Spring elements 68 is shown clearly in FIG. 24. It can be seen that using this configuration there is effectively a single contact point between each of the individual spring elements and the underside of the compliant part 12. Spring element 68-1 acts in a different vertical plane from that of spring elements 68-2 and 68-3. The points of contact of the spring elements define a triangle and thus, a stable sprung base is provided for the compliant member 12. In one example, the contact points between the spring elements 68-1 to 68-3 and the compliant part and coated with a low-friction or non-stick material so as to ensure the two can slide relative to each other.

The underside of the compliant member 12 is shaped to correspond with the locations of the contact points and also to control the force provided by the spring elements. In the example shown, there is a first substantially flat portion 72, a second substantially flat portion 74 and a curved cam portion 76. In normal operation, when the optical PCB connector assembly is in an open configuration, i.e. the first and second parts are not engaged, due to the action of horizontal spring element 70, the compliant part is pushed forwards or towards the entrance to the housing 10. The spring elements 68-1 to 68-3 are positioned so as to apply fairly equal pressure on the three mating places.

During an initial phase of insertion (FIGS. 9 and 10), it is desirable that the compliant part 12 is not pushed back into its housing 10. To stop this happening, one or more horizontal spring elements 70 counter the small insertion forces taking place until the full detent mating has happened. Once the rounded stubs on the optical engine cover have been forced into the compliant parts mating depressions (FIG. 11), by the beam springs underneath, the optical engine cover 24 cannot travel any further without pushing back on the compliant part 12. If the optical engine were to stop entering the connector at this point, there would only be minimal mating forces on the spring element 68-1 to 68-3 that allow up and down motion of the compliant part during insertion. So as to achieve and maintain a good coupling, the spring forces are preferably increased.

This is achieved by the use of ramp inclines 76 and 78 on the bottom surface of the compliant part 12. The inclines 76 and 78 function as cam surfaces and serve to bend the spring elements downwards, thereby gradually applying more upward force to the compliant part and ultimately against the optical engine cover. The ramp inclines 76 and 78 change back to a flat profile so that the springs reach a maximum deflection even if the travel continues beyond a certain point. This allows for some insertion end of travel tolerances.

FIGS. 12 to 15 show the effect of the ramped inclines on the spring elements 68-1 and 68-2 (68-3 cannot be seen as it has the same side profile as that of 68-2).

Figure 12:
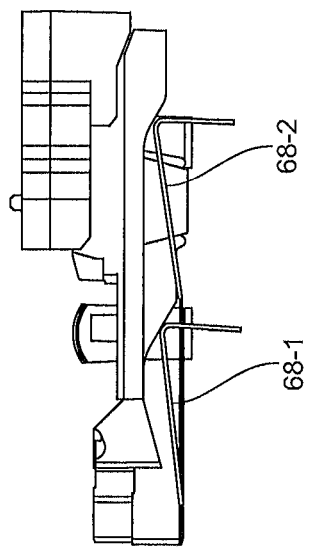
FIGS. 12 to 15 show a schematic representation of the stages of interaction between an optical engine cover and a compliant part once engagement has already been achieved within an optical PCB connector assembly.
Figure 13:
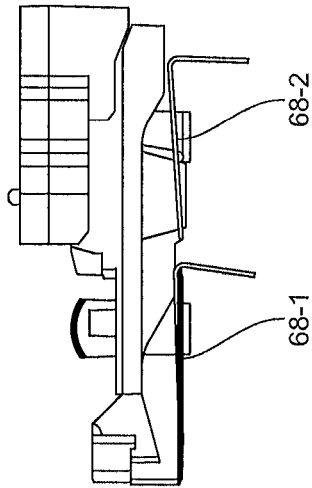
Figure 14:
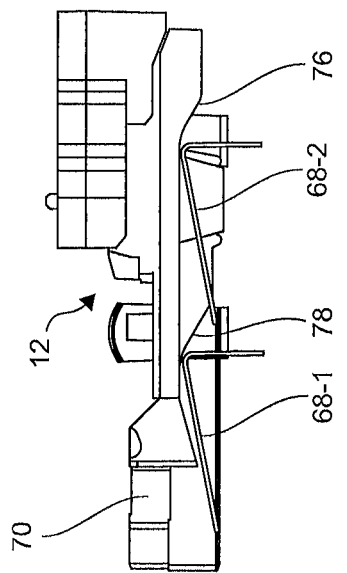
Figure 15:
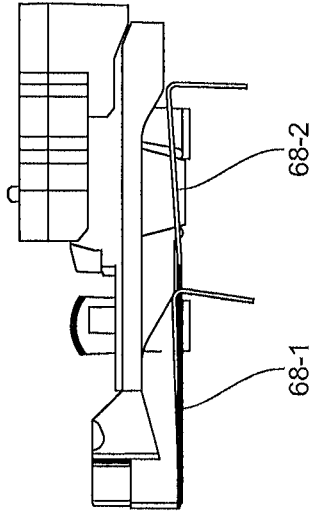

As can be seen, the underside of the compliant part 12 has curved camming surfaces 76 and 78. As the compliant part moves from the position of FIG. 12 to that of FIG. 15, the progression of the spring elements 68-1 to 68-3 along the underside surfaces of the compliant part 12 can be seen. In FIG. 12, the spring elements first encounter the camming surfaces 78 and 76. In FIG. 13 the spring element 68-1 can be seen approximately half way along the surface 78. In FIG. 14 the spring elements 68-1 and 68-2 have reached the end points of the camming surfaces 76 and 78 such that in FIG. 15 they are again pressing against flat parts of the underside of the compliant part 12.

Importantly, as can be seen in FIGS. 12 to 15, the horizontal spring element 70 can be seen to be undergoing compression. Indeed, in each of FIGS. 12 to 15 the stubs 58 and 64 are in their engaged positions on the compliant member. Thus, the movement of the compliant member as seen in FIGS. 12 to 15 is due to the over insertion of the optical PCB into the connector. During the push back phase of insertion, the spring element 70 is compressed. This serves to push the compliant part 12 back to its initial forward position when the connector is unloaded. As well as up and down movement, the compliant part must also be capable of movement in a side-to-side motion during the insertion process. The rounded stubs of the optical engine cover force this movement to happen. Indeed, the motion is necessary to accommodate for differences in the centre line of the moving part versus the fixed section of the connector.

Figure 16:
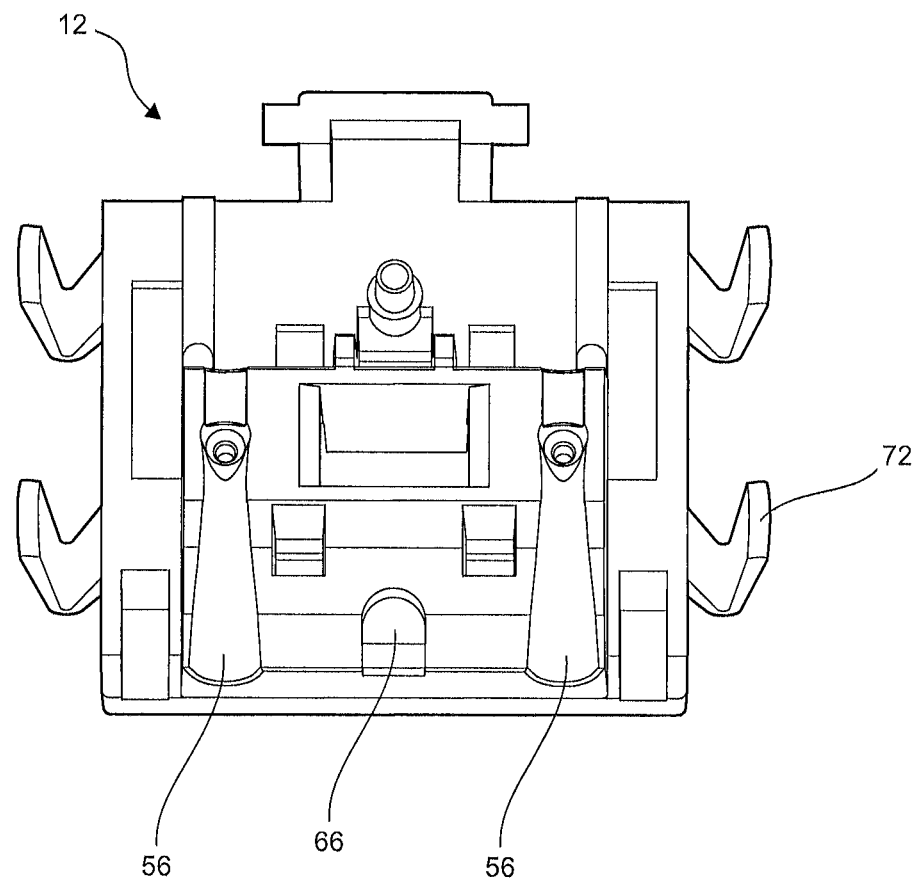
FIG. 16 shows a perspective view of a compliant part from within an optical PCB connector assembly.
Figure 23:
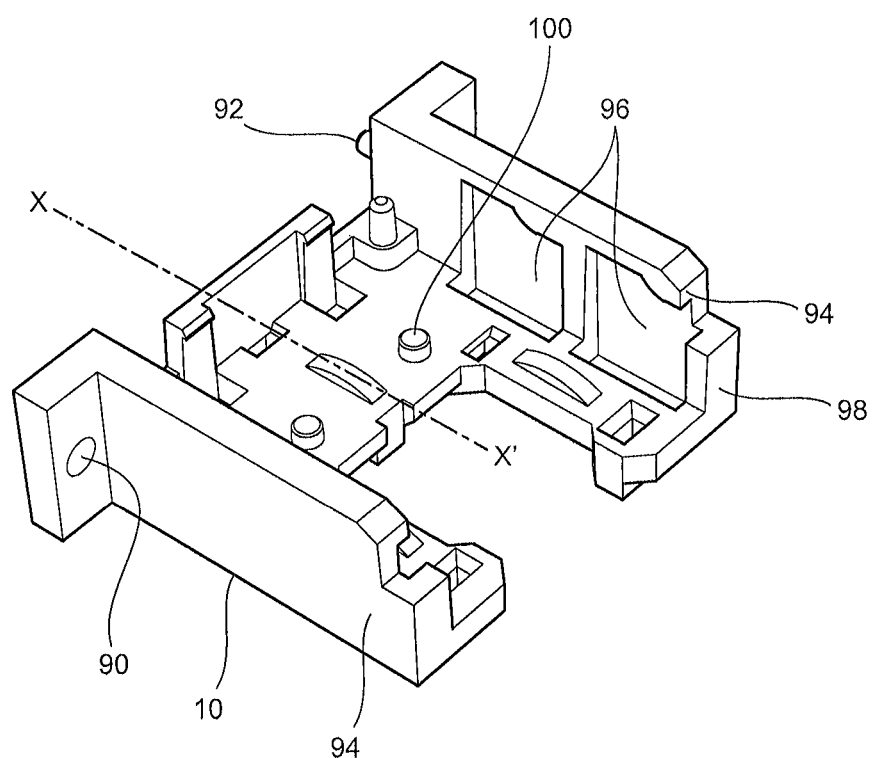
FIG. 23 shows the static part of a housing from an optical PCB connector assembly for housing the compliant part of any of FIGS. 16 to 22.

FIG. 16 is a schematic representation of the compliant part 12 as it would be encountered by the optical PCB 5 during insertion or engagement of the optical PCB connector assembly. As explained above, in use, the compliant part 12 is mounted within housing 10 of the first part 2 of the optical PCB connector assembly. As can be seen, the compliant part 12 comprises biasing projections in the form of V-shaped protrusions 72 which allow it to be maintained within the housing 10 of the first part 2 whilst still being able to move or "float" in the manner described above. The protrusions 72 provide lateral spring forces that keep the compliant part 12 centred within the housing 10 when not loaded. The protrusions can be used to provide at least one degree of freedom (in the x direction as shown in FIG. 2) to the compliant part in that they enable side-to-side or lateral movement within the fixed housing. In addition, the protrusions, where they encounter the edges of recesses 96 (see FIGS. 23 and 24) within the housing 10 limit the movement upwards within the housing 10 due to the effect of the spring.

In addition, the protrusions 72 keep the compliant part 12 loosely captured in the housing 10. The particular v-shaped configuration of the protrusions 72 is advantageous in that it allows for an easy snap fitting of the compliant part 12 into the housing 10 during assembly of the device. The protrusions 72 are preferably moulded into the compliant part 12 during manufacture. In an alternative, spring metal V-shaped tabs are used instead of moulded plastic. This can be used where the specific application so demands but will add cost to the manufacture of the unit.

Figure 17:
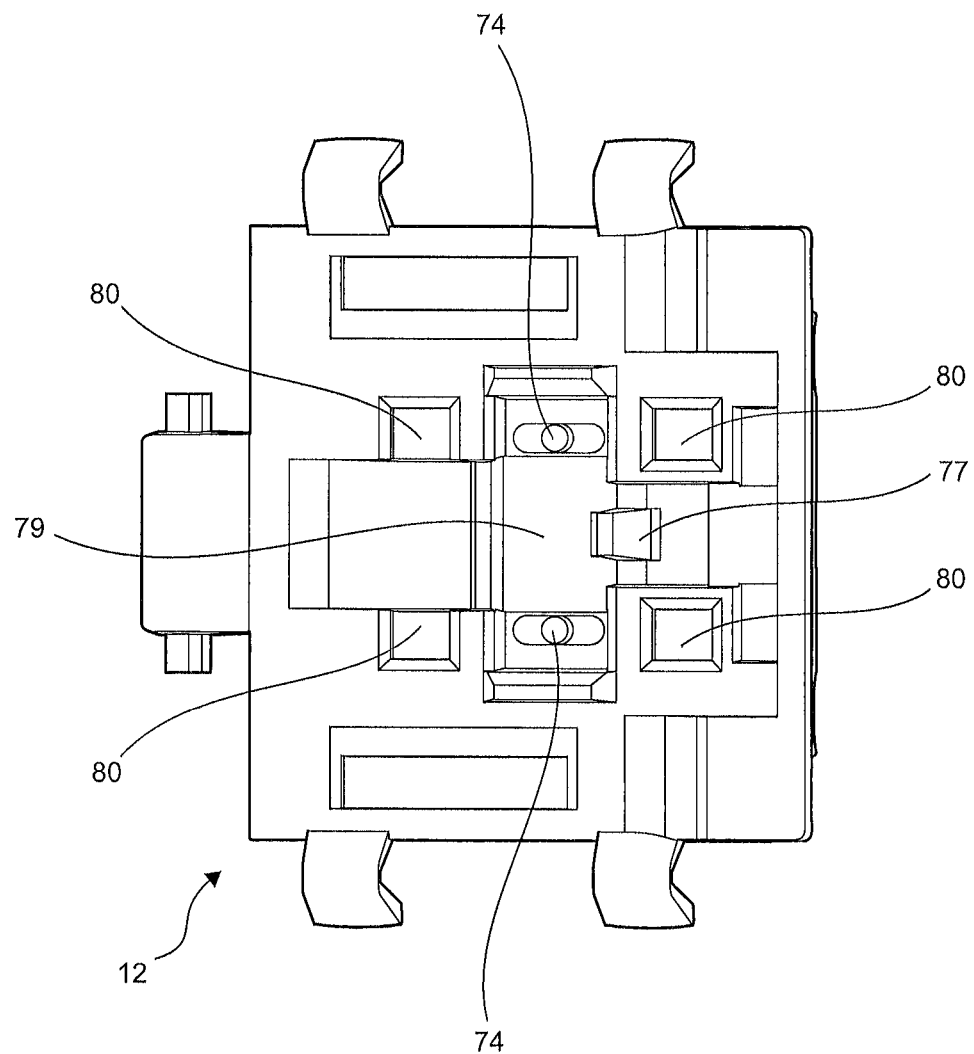
FIG. 17 shows a perspective view from below of the compliant part of FIG. 16.
Figure 30:
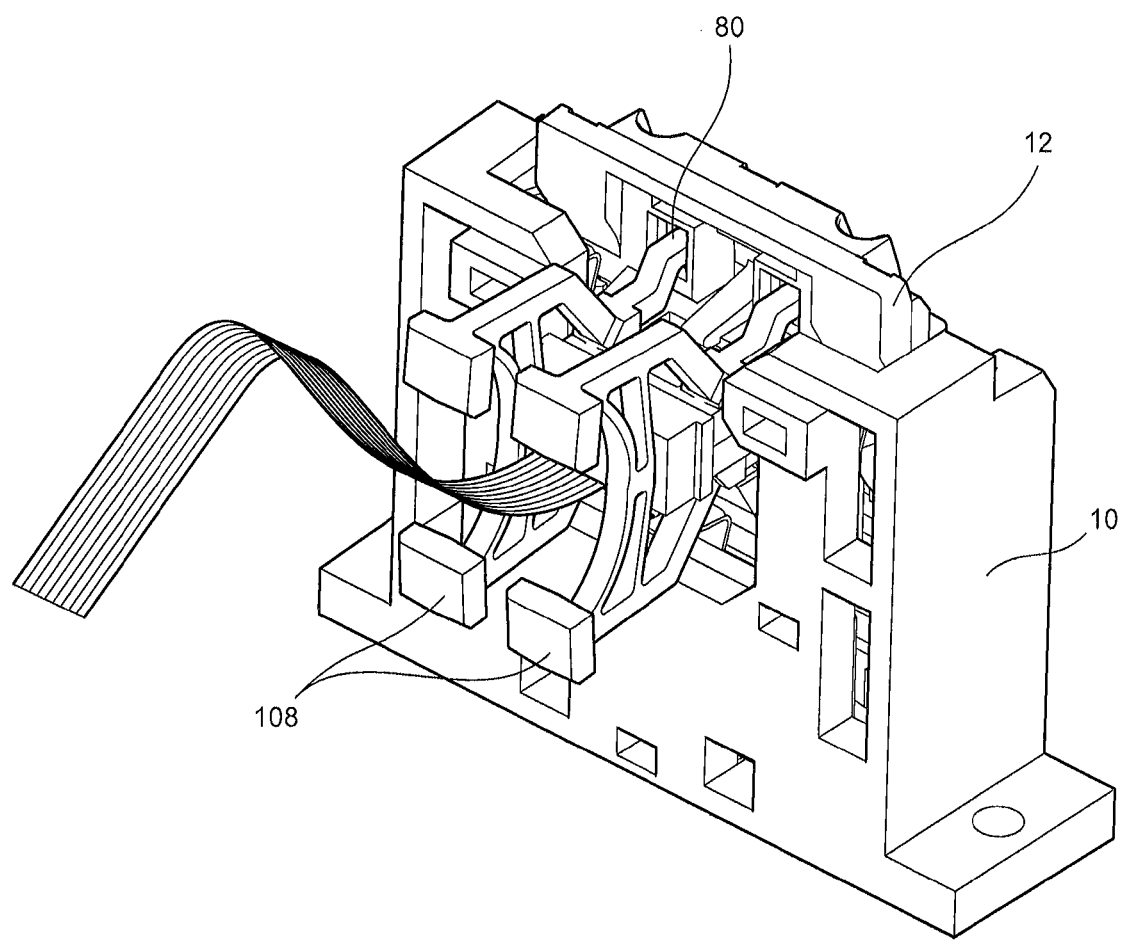
FIG. 30 shows a schematic representation of the connector assembly in an engaged configuration from below.
Figure 33:
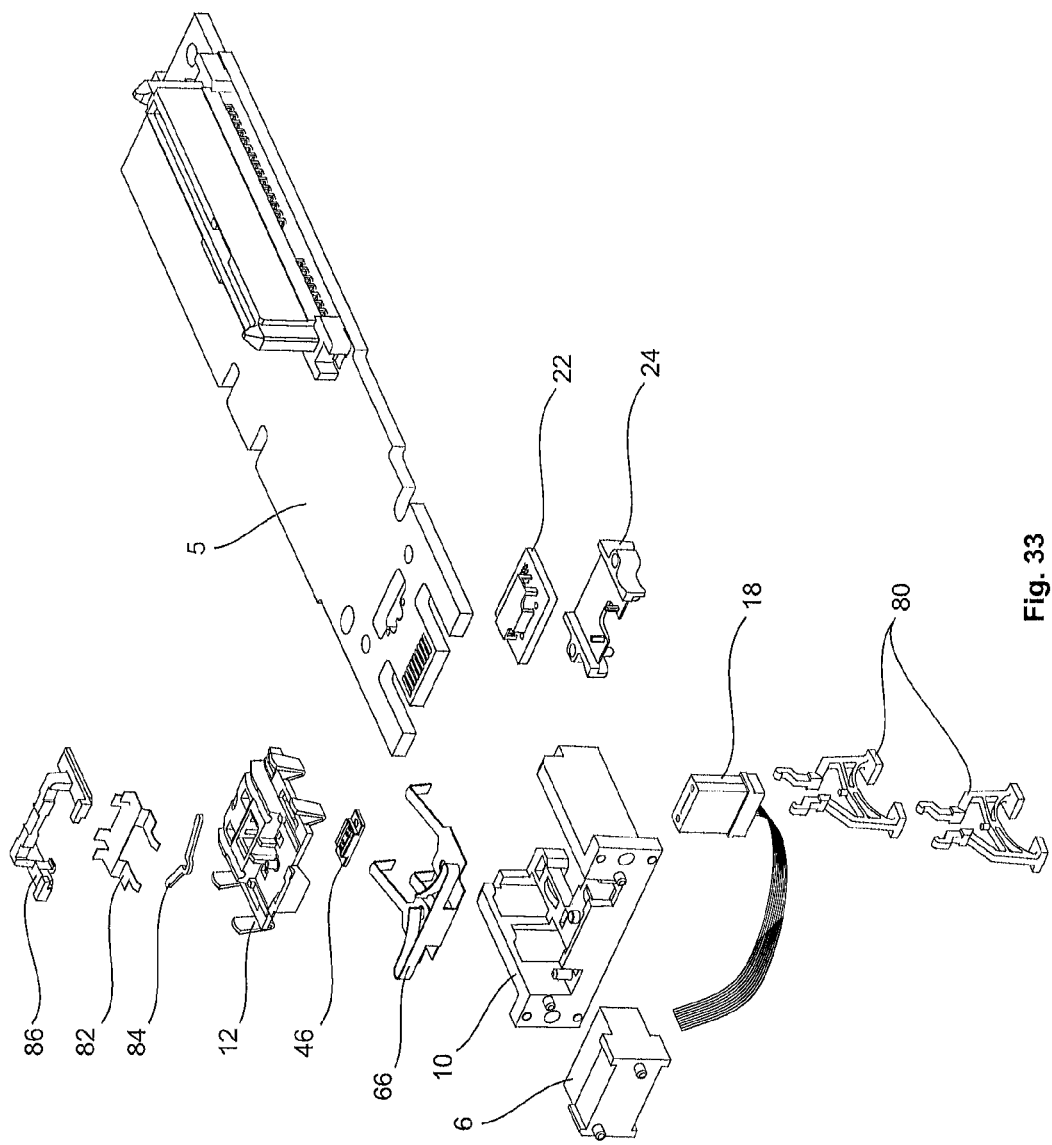
FIG. 33 shows an exploded view of the connector assembly.

Optical alignment on the underside of the compliant part 12 is, of course, also extremely important. This will be described with reference to FIG. 17. Alignment of the ferrule 18 with the compliant part 12 is of course important since it, ultimately, determines the alignment of the optical engine with the MT ferrule or plug 18. To achieve accurate alignment of the MT ferrule 18 with the compliant part 12, alignment dowels 74 are provided. In addition, a retention clip 77 is provided for holding the MT ferrule 18 in position. The rounded MT ferrule alignment dowels are provided in a recess 79 on the underside of the compliant part 12. Should the recess in the MT ferrule prove to be unreliable or not strong enough to maintain the MT ferrule captured in some situations, retainer devices 108 (see FIGS. 30 and 33) may be used to ensure secure fixing of the MT ferrule 18 to the compliant part 12. In the example shown in FIG. 17, openings 80 are provided which can receive retainers which serve to improve the engagement or connection of the MT ferrule 18 to the compliant part 12. In most situations, these retainers will not be required.

In some embodiments, the lens array insert which is provided on the MT ferrule 18 and therefore within the recess 79, is glued in place or even moulded into the compliant part 12. Such an arrangement would serve both to reduce the cost of manufacture and improve alignment of the lenses with the compliant part 12.

Figure 18:
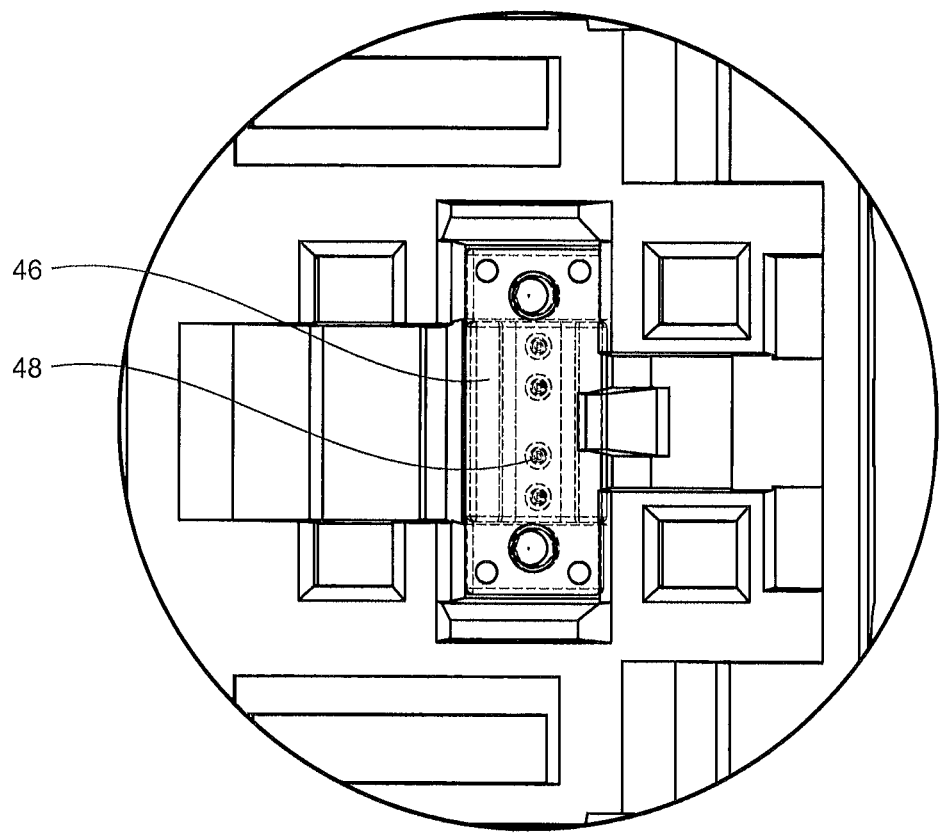
FIG. 18 shows a schematic representation of the compliant part of FIGS. 16 and 17 including a lens array.
Figure 19:
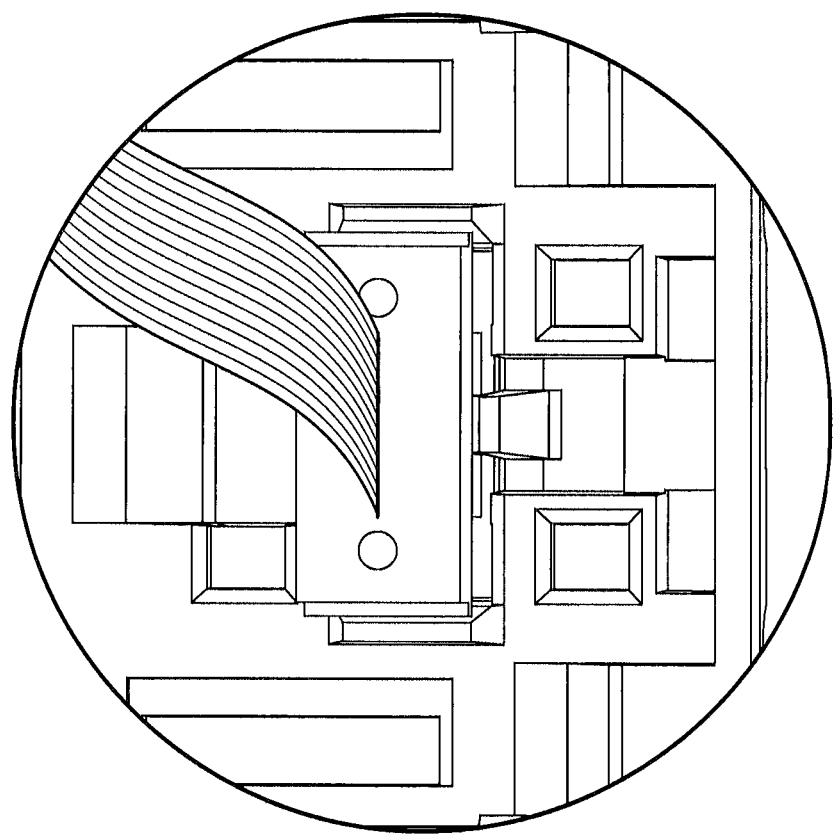
FIG. 19 shows the compliant part of FIG. 18 with an MT ferrule connected thereto.

Referring to FIG. 18, the underside of the compliant part 12 is shown (as in FIG. 17) except in this case, the lens array insert 46 is shown in place. As explained above, this can be glued or even moulded into the compliant part 12 during manufacture. The lens array insert 46 can be seen with lenses 48 which serve to collimate light passing from or focus light passing to the MT ferrule 18 shown in position in FIG. 19.

Thus, it will be appreciated that the configuration of the compliant part is such that although it is maintained within the housing 10 of the first part 2 of the optical PCB connector assembly, it can, to a certain degree "float" within the housing 10 so as to enable relative movement between itself and the electrical connector 6 which is fixedly coupled to the housing 10. Therefore, once an electrical connection is made between the PCB and the connector assembly the compliant part 12, under the biasing force of the springs described above, moves so as to ensure engagement and alignment with the optical components on the inserted optical PCB 5. Therefore, the problems of alignment when using face-to-face connection as described above, is addressed. Furthermore, the use of collimating lenses ensures that the surface area available for optical communication between the MT ferrule 18 and the optical engine 22, is increased.

As also mentioned above, dust accumulation on the end faces of optical fibres and/or the lenses can be a problem. This is particularly the case where small optical fibre or waveguide end faces are used. In this case, a single dust particle can obscure a significant proportion of the surface area of the end face so as to appreciably worsen the quality of a passing light signal. In the present system, a dust shield is provided which serves to minimize the chance and effects of dust particles settling on the optical surfaces on the MT ferrule or plug 18. Indeed, to protect the lens array insert 46 that is mounted in the compliant part (as shown in particular in FIG. 18) a spring loaded sliding cover with shield is included.

Figure 20:
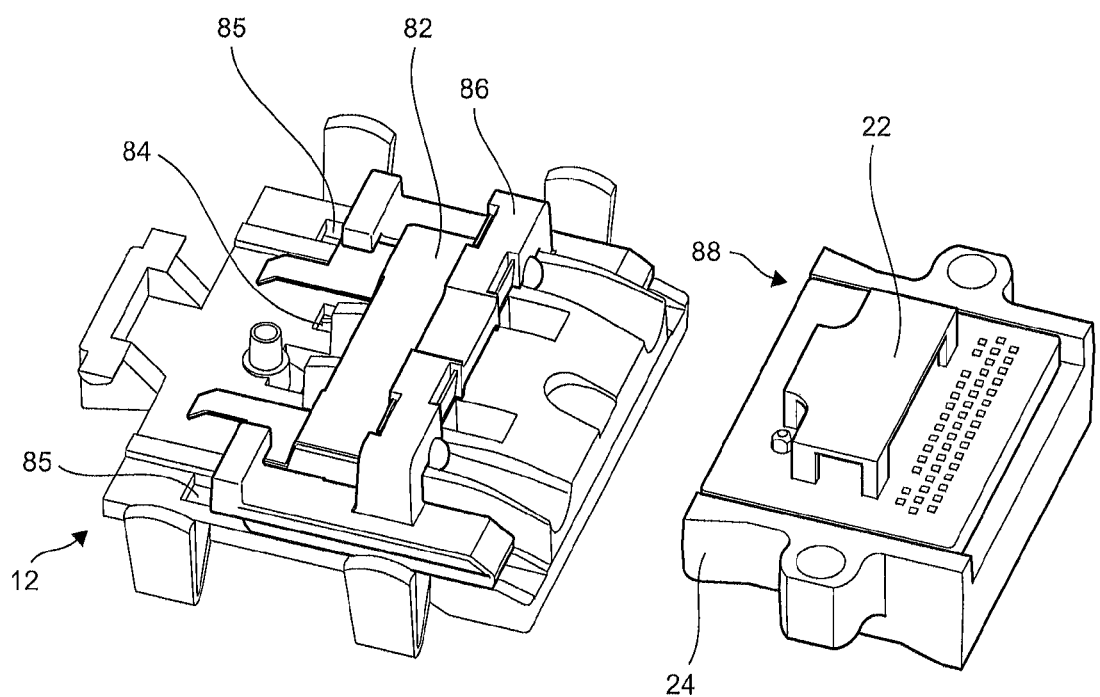
FIG. 20 shows a schematic representation of the compliant part of FIGS. 16 to 19 together with an optical engine and optical engine cover from an optical PCB connector assembly.

Referring to FIG. 20, components already described will not be described again but it will be seen that a dust shield 82 is provided which, in a normal closed position, sits above the lens array insert 46 forming a dust guard around it and thereby stopping dust from the environment settling on it. The shield 82 is biased in a closed position by a spring member 84. A dust shield slider 86 is provided, mounted in guide tracks 85 formed on the compliant part 12. The slider 86 is arranged, when an optical engine housing as described above is brought into contact with the compliant part, to cause the dust shield 82 to slide back and thereby expose the lens array 46 below.

Figure 21:
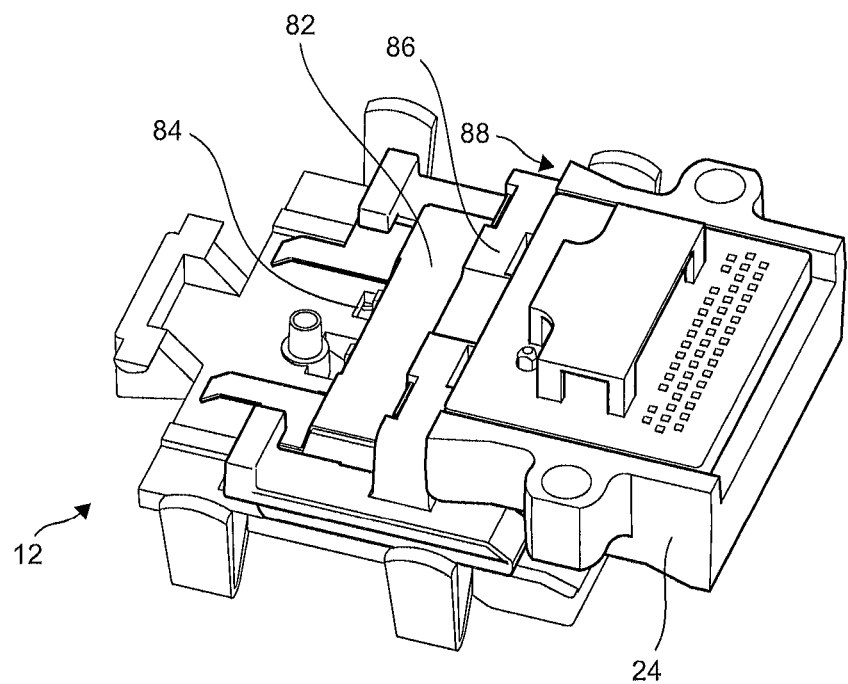
FIGS. 21 and 22 show the components of FIG. 20 in different stages of engagement.
Figure 22:
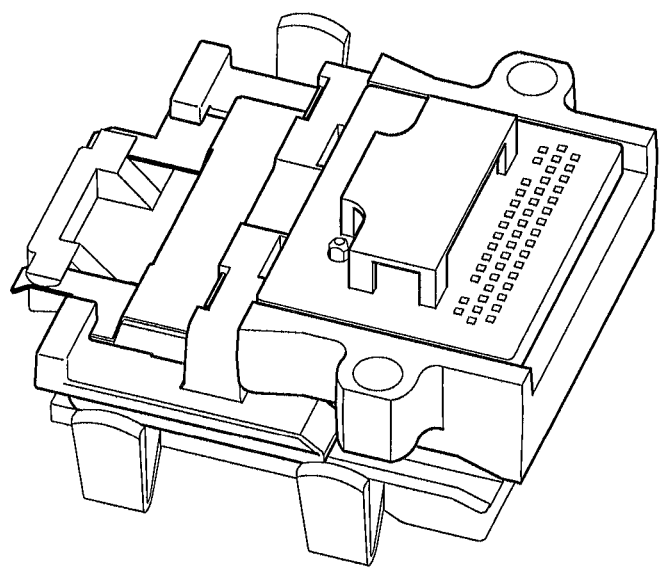

As shown in FIGS. 21 and 22, when the housing 24 from the optical engine engages with the compliant part 12 in the manner described above, abutment surfaces 88 of the optical engine cover 24 engage the slider 86 so as to force the shield 84 into its open position. The spring member 84 is thus in a stressed state such that once the connection between the optical engine housing 24 and the compliant part 12 is broken the slider is forced back into its rest position such that the dust shield will automatically close again.

Preferably, the dust shield 82 is provided with a fine brush or fabric section (not shown) so as to gather or wipe away particles of dust that might have accumulated on the lens array 46.

When the optical engine printed circuit board 5 and optical engine cover 24 has entered partway into the guiding grooves 56 of the compliant part 12 (FIG. 21), surfaces 88, through their interaction with slider 86, begin to push the sliding dust cover 82 so as to reveal the lens array 46 below to the approaching optical engine. The spring member 84, which is preferably a torsion spring, is relatively weak and applies a minimal force so as to keep the dust cover in place but so as not to significantly impede the coupling and mating operations as described above.

Once the optical engine cover 24 is seated into its working detent position as described above, in combination with the sliding dust cover a wall perimeter is effectively formed shielding the air gap between the optical engine and the lens array insert. This serves to reduce air flow in the light transmission coupling zone and therefore dust build-up on the surfaces during operation. When the connector is disengaged, the sliding dust shield moves back under force of the torsion spring 84 to again assume its covering position protecting the optical surfaces of the lens array.

The system of dust protection has the advantage over known designs in that it serves to keep the optical surfaces protected during the entire connection process. This can be important if the connector has been inside a working system for some time because there will inevitably be dust build-up on every surface within the system including the connector. The dust cover may have dust build-up on it, but since the connection process relies on closing off the connection zone before pushing the dust shield 82, it is less likely that dust particles will be disturbed and float into the optical connection zone.

Should, despite the system of the dust shield described above, the optical lens surface get dirty over time, a cleaning device may be provided. The cleaning device is essentially a dummy plug in unit that has a fabric and liquid cleaning agent located where the optical engine would normally be found. Insertion of the dummy plug into the compliant part and withdrawing therefrom will clean the surfaces of the lenses due to interaction between the lenses and the fabric and liquid cleaning agent.

Referring now to FIGS. 23 to 26, the arrangement of the first part 2 of the optical PCB connector assembly will now be described. The housing 10 is provided with openings 90 through which connectors (not shown) may be used to bolt the housing 10 to an optical PCB such as a back plane in a storage system. Pins 92 may also be provided on an abutment surface of the housing 10 to enable alignment of the housing on the optical PCB.

The housing serves two main purposes. A first is to contain the compliant part 12 within working boundaries, as described above and a second is to serve as a mounting structure for the springs described above with reference to FIG. 24. The housing 10 comprises sidewalls 94 having recesses 96. The recesses serve to house the V-shaped protrusions 72 provided on the compliant part 12 and described above with reference to FIG. 16. The recesses 96 may be formed during moulding of the housing 10. An end flange plate 98 is provided to ensure that the V-shaped projections are fully enclosed within the housing 10 and thereby ensuring that although the compliant part 12 is able to move relative to the housing 10 it is maintained within it. The width of the recesses 96 has an effect on the amount of movement in the direction of the axis X that the compliant part 12 is able to make.

Referring to FIG. 24, one or more registration dowels 100 are provided on the bottom surface of the housing 10. The one or more registration dowels are provided to engage with a corresponding number of openings 102 provided in the spring member 68. Preferably, the spring member 68 is heat welded in place within the housing 10 with the dowels or force fitted onto the dowels. In other words, an interference fit between the dowels 100 and openings 102 may be provided.

Figure 25:
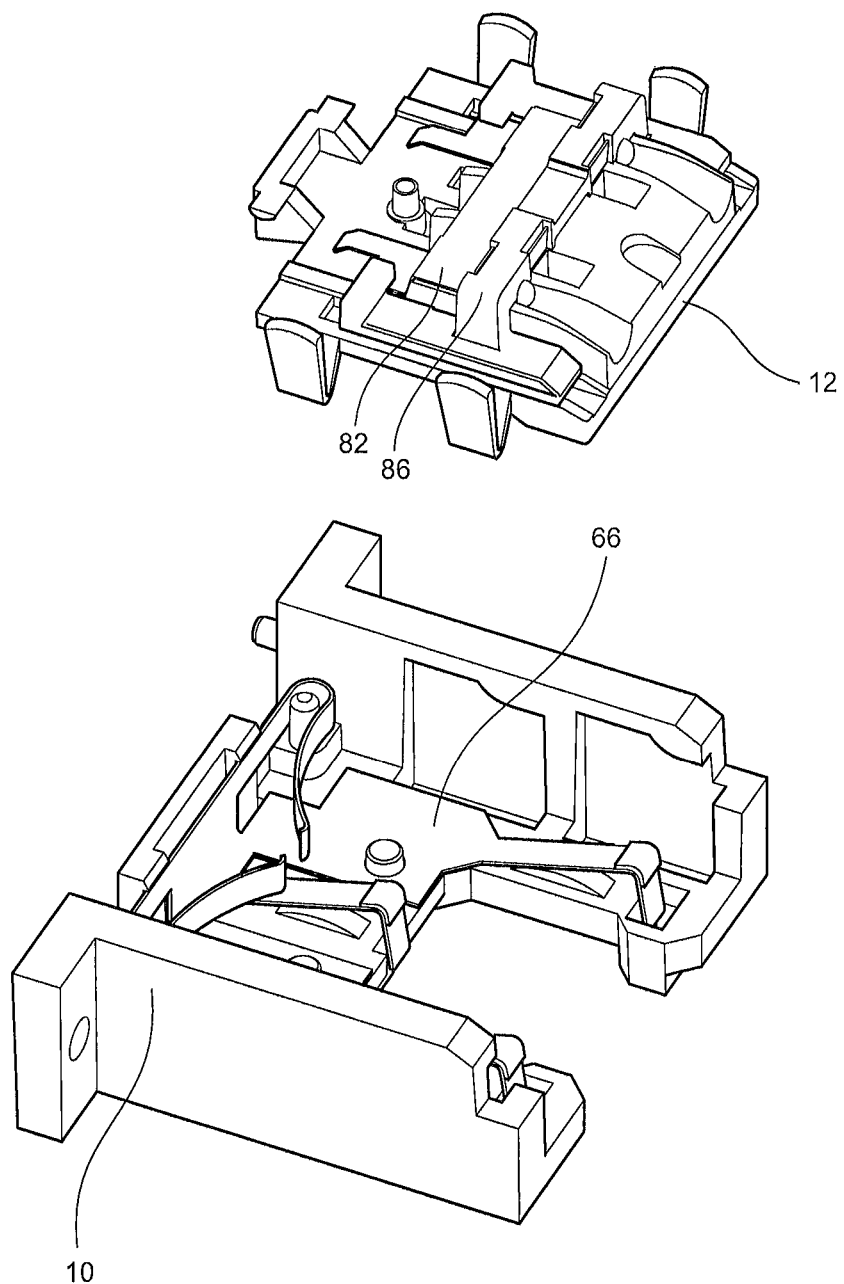
FIGS. 25 and 26 show the static part of the housing of FIG. 23 together with the compliant part of FIGS. 16 to 22, both unassembled and assembled.
Figure 26:
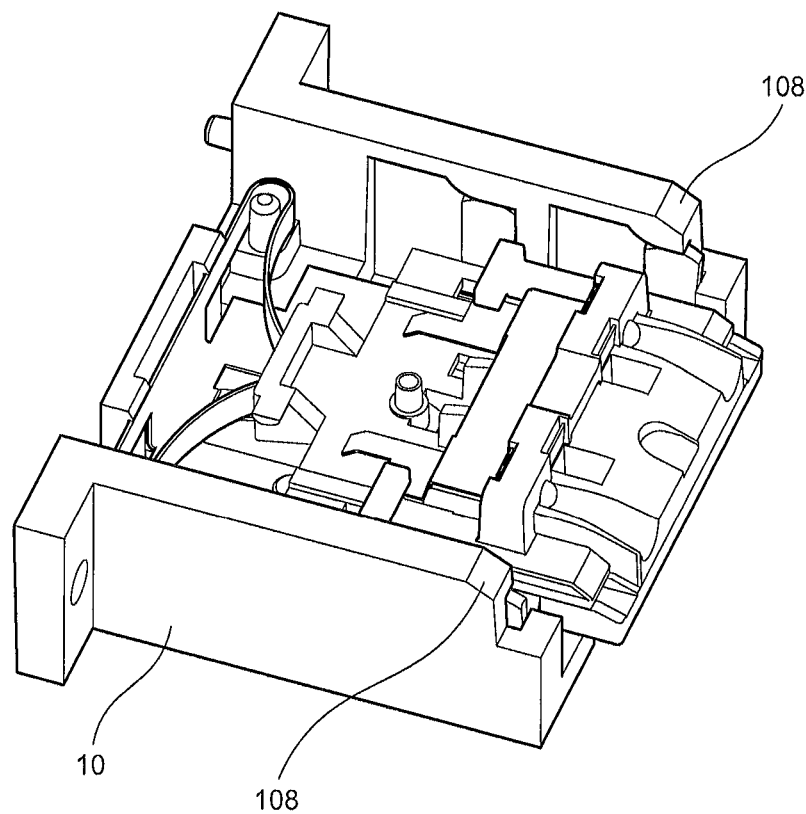

FIG. 25 shows the housing 10 with the spring member 68 fitted therein. The compliant part 12 with the slider 86 and dust shield 82 is shown above it. Last, in FIG. 26, the fully assembled arrangement is shown.

Thus far, only the optical and mechanical aspects of the optical PCB connector assembly have been described. However an electrical connection is also required so as to enable the optical PCB connector assembly to operate. The optical engine together with the periphery electrical components do of course require electrical power and control signals to operate. The power could be provided by a cable and standard connectors but as described above, the present assembly enables electrical connection to take place at the same time as the optical connection.

Figure 27:
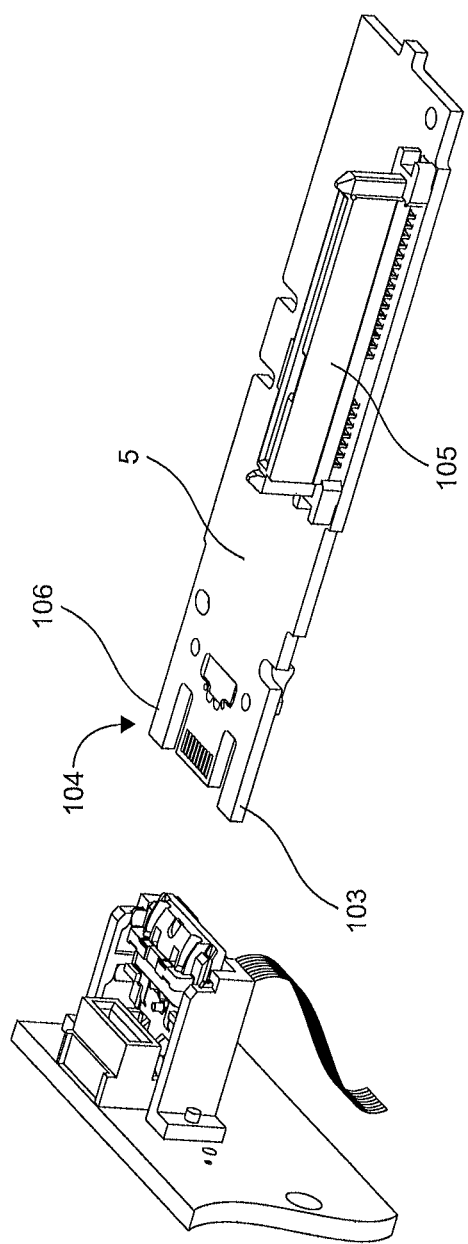
FIGS. 27 to 29 show the connector assembly as would be provided on two PCBs, during various stages of engagement.

The PCB 5 carrying the optical engine can easily connect to electrical power and data if need be by simply plugging into a standard edge card connector. In the example shown in FIG. 27, the connector is a dual nine contact product made by Samtec Inc. but a skilled person would appreciate that others like this could also be used. The edge card connector fits in close proximity to the optical connector as described above and an edge card connector may be incorporated into the design of the fixed section. In this example, a socket 105 is provided on the PCB 5 to which can be connected a device such as a hard disk drive.

The end portion 104 of the PCB 5 is machined into a shape so as to serve as a protective structure to the optical engine cover. Two tabs 106 are provided that are arranged to engage cam surfaces 108 on the housing 10 (seen in FIG. 26) in the event that the connector enters at too low an altitude relative to the housing 10. Thus, the tabs 106 force the PCB to slide up when it hits the cam surfaces 108 of the housing 10. This ensures that the optical engine connector does not enter too low which could cause damage. It also means that the end portion 104 will enter the Samtec electrical connector 6 easily. The positioning relative to the optical connector is important in the horizontal direction as well but the alignment of the electrical components will ensure that there is general horizontal alignment with the optical components in any event.

As explained above, once the insertion process has taken place in the Samtec connector 6 both the electrical and optical connections will have been established. Even if the end portion 104 of the printed circuit board 5 is not fully in, the device will still function as long as it is inserted to a minimum required distance and the compliant part can move so as to ensure optical connection. In other words, even if a user fails to fully engage the electrical connection or there is extra depth allowance provided in the engagement design, due to the movable nature of a compliant part 12, a full functional connection between the two parts of the optical PCB connector assembly can be made. In other words, in some examples, the design could be configured such that the respective first and second parts of the connector assembly do not bottom out, for, say, thermal expansion reasons or mechanical tolerances.

Figure 28:
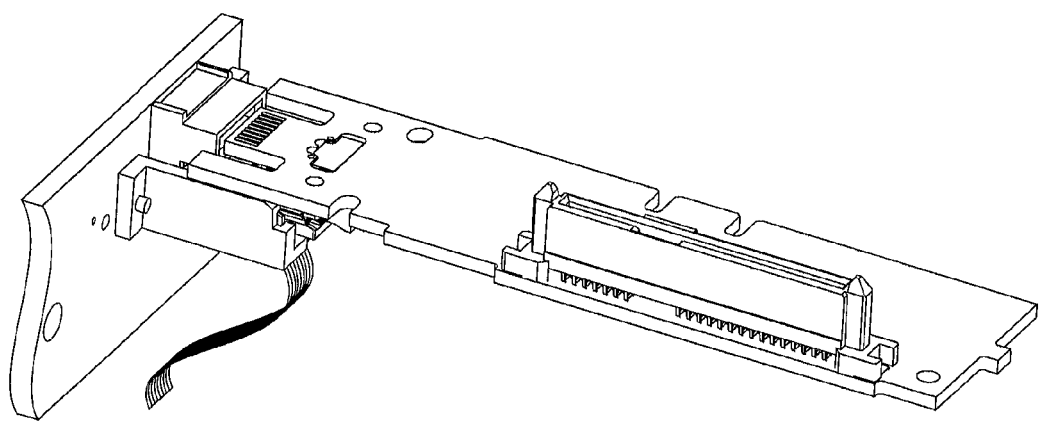
Figure 29:
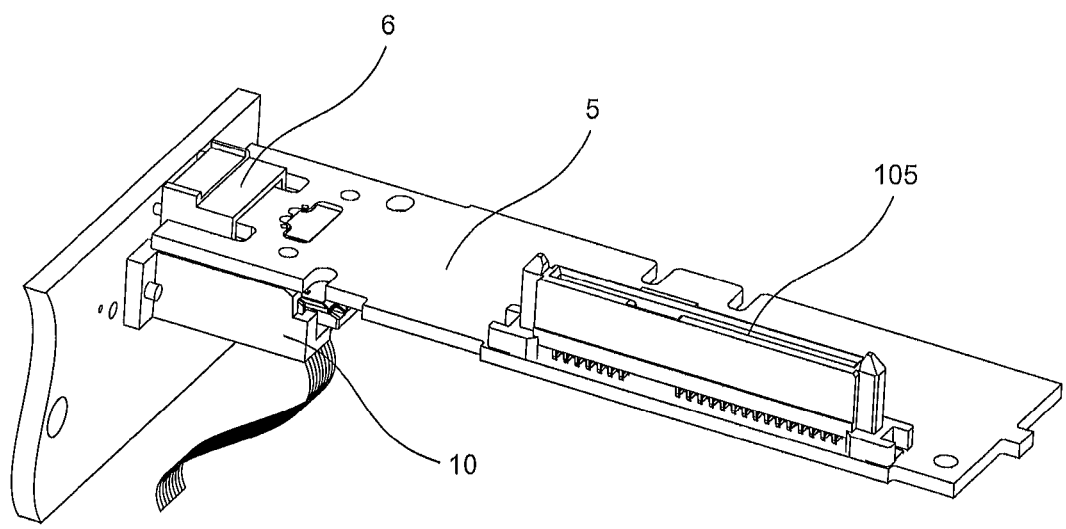

FIGS. 28 and 29 show the stages of connection between the electrical parts of the connector. As the electrical parts connect, the optical connection will be made within the housing 10 as described below. It will be appreciated, that once the optical PCB connector assembly is engaged, the PCB 5 offers protection to the optical engine and interfaces which are encased within the housing 10 and the PCB 5 itself.

As explained above, with reference to FIGS. 1 and 2, the connector has preferably a fibre tail exiting the back side of the compliant part 12. The fibre tail may consist of any number of fibre optics but preferably, only four are used. It can easily be modified to include up to 72 fibres in any combination of transmit and receive functions. As also mentioned above, and as shown in FIG. 30, opening 80 may be provided in the underside of the compliant part 12. This enables a containment member to provide an added degree of security between the MT ferrule 18 and the compliant part 12. In the example shown, a retaining clip 108 is provided to secure the MT ferrule 18 to the compliant part 12.

Figure 31:
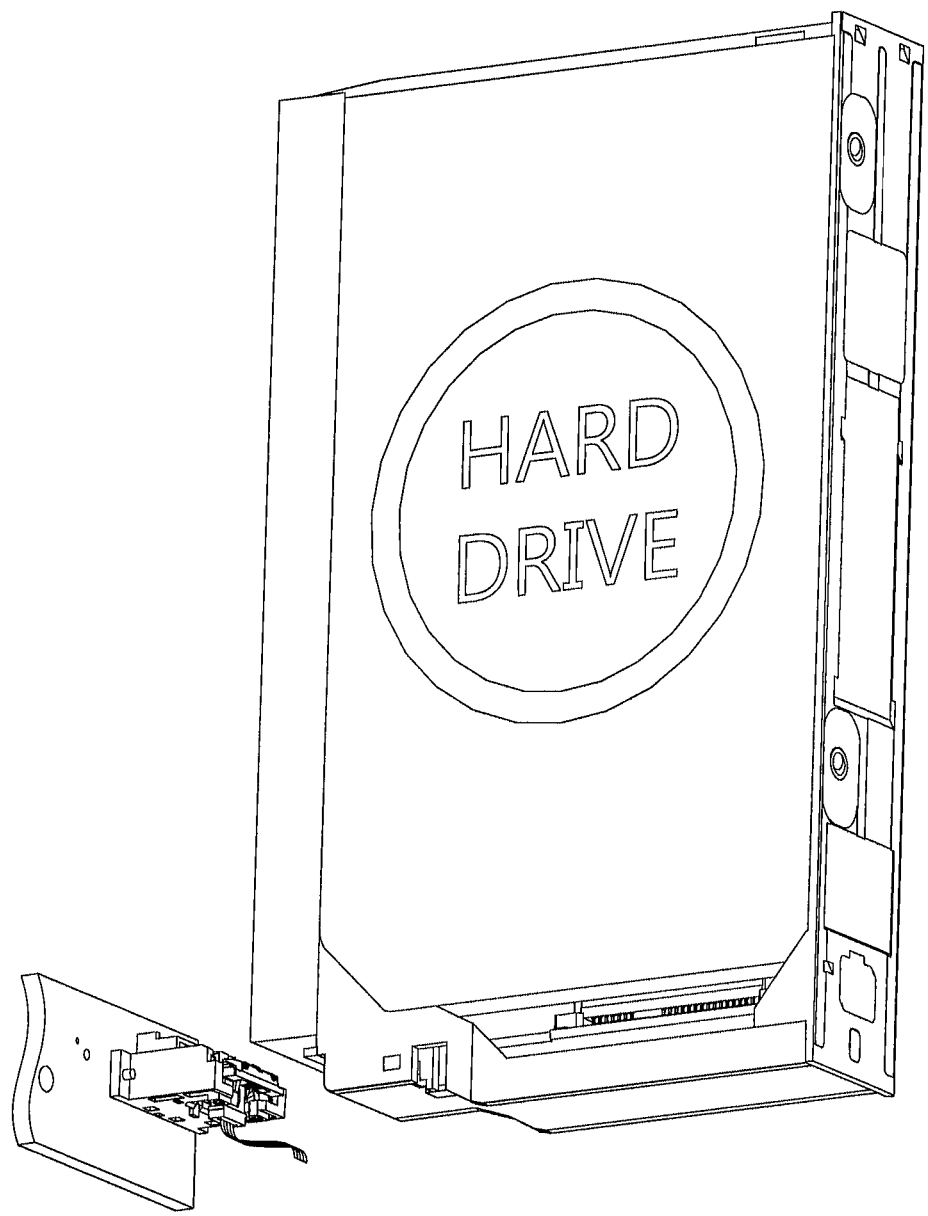
FIGS. 31 and 32 show the connector assembly as provided on a backplane and a PCB connected to a hard disk drive, during various stages of engagement.
Figure 32:
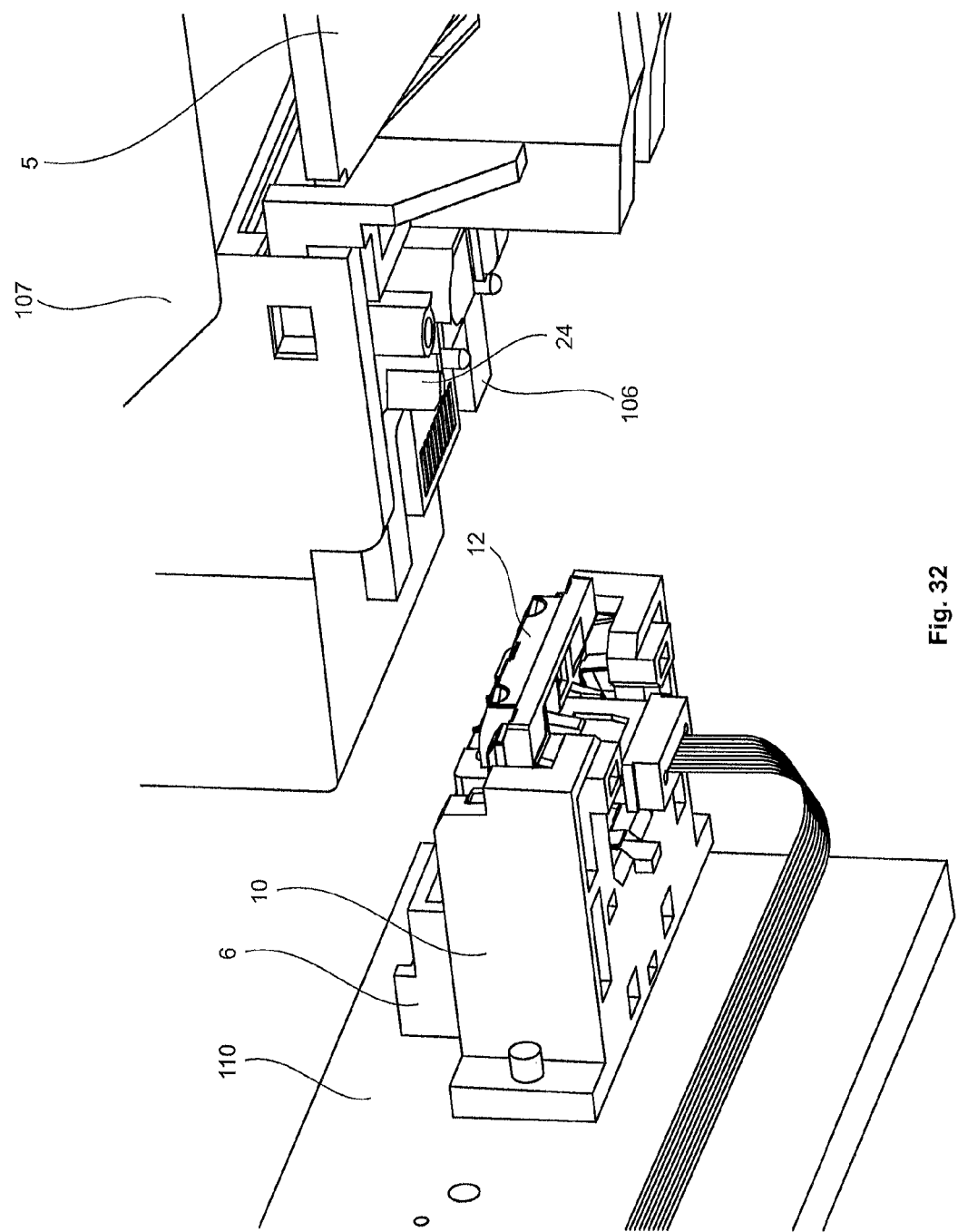

FIGS. 31 and 32 show how the connector assembly may operate in one particular example. Referring to these figures, a back plane 110 is provided having the housing 10 mounted thereto. As can be seen, the connector assembly includes the housing 10 together with the electrical socket 6 such as a Samtec electrical connector. A PCB 5 including an optical engine and cover 24, as described above, is provided. An electrical connector including side members 106 is provided. A hard disk drive 107 can easily be connected to the connector housing 10 and the compliant part 12 by a simple plug in action. In use, a user would simply plug the first and second parts 2 and 4 of the optical PCB connector assembly together until the optical compliant part 12 snap fits with the optical engine 22. If the printed circuit board 5 or hard disk drive 107 need to be removed, the connector assembly may simply be pulled out as with any other plug in board.

As it is extracted, the electrical contact will break and the compliant part 12 will begin to spring back into the forward rest position due partially to the withdrawal process and partially to the effect of the spring members described above. The stubs on the optical engine cover 24 will pull out of the guides 56 when the beam spring forces below diminish. As the optical engine cover begins its exit from the compliant part 12, the dust cover springs back to its rest position protecting the lens array 46 on the MT ferrule 18. Therefore, a simple and reliable means for achieving optical connection between two PCBs is provided.

Embodiments of the present invention have been described with particular reference to the examples illustrated. However, it will be appreciated that variations and modifications may be made to the examples described within the scope of the present invention.

The invention claimed is:

1. An optical connector assembly for arrangement on a first optical printed circuit board and for connecting the first optical printed circuit board to a second optical device on a second electro optical printed circuit board, the connector assembly comprising:
   an electrical connector;
   and an optical connector;
   the optical connector being arranged in a housing that is fixed relative to the electrical connector, the optical connector being movably mounted in the housing so that the optical connector can move relative to the electrical connector, such that when electrical connection is made, the optical connector can still move with at least three degrees of freedom.

2. An optical connector assembly for arrangement on a first optical printed circuit board and for connecting the first optical printed circuit board to a second optical device on a second electro optical printed circuit board the connector assembly comprising:
   an electrical connector;
   and an optical connector;
   the optical connector being arranged in a housing that is fixed relative to the electrical connector, the optical connector being movably mounted in the housing so that the optical connector can move relative to the electrical connector, such that when electrical connection is made, the optical connector can still move with at least three degrees of freedom wherein the optical connector comprises a movable compliant part mounted within the fixed housing and arranged to move relative to the housing upon engagement with a corresponding connector on the optical printed circuit board.

3. An optical connector assembly according to claim 2, in which the compliant part has guidance grooves to engage in use with corresponding projections on the other optical PCB.

4. An optical connector assembly according to claim 2, comprising a spring member to bias the compliant part away from the housing, the spring member being configured to provide at least two degrees of freedom to the compliant part.

5. An optical connector assembly according to claim 4, in which the spring member is a unitary component arranged to bias the compliant part in two orthogonal directions.

6. An optical connector assembly according to claim 5, in which the spring member is a stamped metal sheet.

7. An optical connector assembly according to claim 4, in which the spring member has plural spring elements configured to provide a balanced supporting force to the compliant part.

8. An optical connector assembly according to claim 4, comprising biasing projections coupled to lateral sides of the compliant part to provide a third degree of freedom.

9. An optical connector assembly according to claim 4, comprising a shaped surface to engage with spring member.

10. An optical connector assembly according to claim 9, in which the shaped surface comprises one or more sloped cam surfaces to enable a variable biasing force to be provided in dependence on the connector assembly position.

11. An optical connector assembly according to claim 2, in which the compliant part has a recess for receiving an optical component for receiving and transmitting optical signals, the optical component being aligned with the compliant part using one or more guide pins.

12. An optical connector assembly according to claim 2, in which the compliant part has a slidable shield to cover an optical component when provided in the compliant part and automatically clean the optical component when the connector assembly is engaged.

13. An optical connector assembly according to claim 11, in which the compliant part has one or more slots or grooves for supporting the shield and to provide controlled movement of the shield as it moves between open and closed positions.

14. An optical connector assembly according to claim 13, comprising an optical component arranged within the recess, the optical component having one or more transmitting or receiving collimating lenses.

15. An optical connector assembly according to claim 14, in which the optical component is an MT ferrule.

16. An optical connector assembly according to claim 14, comprising one or more retaining members to fixedly retain the optical component to the compliant part.

17. An optical connector assembly according to claim 1, in which the housing has cam surfaces to guide the electrical connectors into a mating position.

18. An optical connector assembly for connecting an optical device to another optical device on an electro optical printed circuit board, the connector assembly comprising:
   an electrical connector;
   and an optical engine;
   an optical engine cover fixed relative to the optical engine, the optical engine cover having an opening through which light can be received by or transmitted from the optical engine, guidance components to engage with an optical connector assembly according to claim 1, the electrical connector and the optical engine being fixed relative to each other.

19. An optical connector assembly according to claim 18, in which the guidance components comprise alignment stubs.

20. An optical connector assembly according to claim 19, comprising three or more alignment stubs arranged in a two dimensional configuration so as to enable the alignment stubs to be used in controlling the orientation of the optical engine.

21. An optical connector assembly for connecting a first optical printed circuit board to a second electro optical printed circuit board, the connector assembly comprising a first part for arrangement on the first optical printed circuit board and a second part for arrangement on the second optical printed circuit board, the first part comprising:
   a first electrical connector;
   and an optical connector;
   the optical connector being arranged in a housing that is fixed relative to the first electrical connector, the optical connector being movably mounted in the housing so that the optical connector can move relative to the electrical connection, such that when electrical connection is made, the optical connector can still move with at least three degrees of freedom;

an optical component within the optical connector, having one or more transmitting or receiving collimating lenses;

and, the second part comprising:

a second electrical connector;

and an optical engine;

an optical engine cover fixed relative to the optical engine, the optical engine cover having an opening through which light can be received by or transmitted from the optical engine, guidance components to engage with the first optical connector of the first part, the second electrical connector and the optical engine being fixed relative to each other, the optical engine having one or more transmitting or receiving collimating lenses aligned in use with the one or more receiving or transmitting collimating lenses of the first part.

22. An optical connector assembly according to claim 21, in which in use the lenses of the first part and the lenses of the second part are spaced apart.

23. An optical connector assembly according to claim 22, in which the lenses of the first part and the lenses of the second part are spaced apart by at least 2mm.

* * * * *